(12) United States Patent
Sun et al.

(10) Patent No.: US 9,937,652 B2
(45) Date of Patent: *Apr. 10, 2018

(54) POLYMERIC MATERIAL FOR CONTAINER

(71) Applicant: Berry Plastics Corporation, Evansville, IN (US)

(72) Inventors: David Dezhou Sun, Evansville, IN (US); Philip A Driskill, Newburgh, IN (US); Tony Cain, Spottsville, KY (US); Diane E Marret, Newburgh, IN (US); Debra R Wilson, Houston, TX (US); Timothy S Ponrathnam, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/059,995

(22) Filed: Mar. 3, 2016

(65) Prior Publication Data

US 2016/0257799 A1 Sep. 8, 2016

Related U.S. Application Data

(60) Provisional application No. 62/128,195, filed on Mar. 4, 2015, provisional application No. 62/279,177, filed on Jan. 15, 2016.

(51) Int. Cl.
*B29C 49/00* (2006.01)
*B29C 49/04* (2006.01)
(Continued)

(52) U.S. Cl.
CPC .......... *B29C 49/0073* (2013.01); *B29B 11/14* (2013.01); *B29C 47/0054* (2013.01); *B29C 47/065* (2013.01); *B29C 47/068* (2013.01); *B29C 49/04* (2013.01); *B29C 49/22* (2013.01); *B32B 1/00* (2013.01); *B32B 1/02* (2013.01); *B32B 5/20* (2013.01); *B32B 7/02* (2013.01); *B32B 27/08* (2013.01); *B32B 27/306* (2013.01); *B32B 27/32* (2013.01); *B65D 1/0215* (2013.01); *B65D 1/12* (2013.01); *B65D 81/38* (2013.01); *B65D 81/3846* (2013.01); *C08J 9/06* (2013.01); *C08J 9/122* (2013.01); *B29B 11/10* (2013.01); *B29B 2911/14053* (2013.01); *B29B 2911/14066* (2013.01); *B29B 2911/14093* (2013.01); *B29B 2911/14173* (2013.01); *B29C 47/005* (2013.01); *B29C 47/0023* (2013.01); *B29C 47/56* (2013.01); *B29C 49/48* (2013.01); *B29C 2049/627* (2013.01); *B29K 2023/065* (2013.01); *B29K 2023/0633* (2013.01); *B29K 2105/0005* (2013.01); *B29K 2105/0058* (2013.01); *B29K 2105/04* (2013.01); *B29K 2105/12* (2013.01); *B29K 2223/00* (2013.01); *B29K 2995/0063* (2013.01); *B29L 2009/001* (2013.01); *B29L 2023/00* (2013.01); *B29L 2031/712* (2013.01); *B29L 2031/7158* (2013.01); *B32B 2250/242* (2013.01); *B32B 2250/246* (2013.01); *B32B 2262/0253* (2013.01); *B32B 2262/14* (2013.01);
(Continued)

(58) Field of Classification Search
CPC ... B29C 49/0073; B29C 49/22; B29C 47/065; B29C 47/0054; B29C 47/068; B29C 49/04; B29C 47/005; B29C 46/56; B29C 47/0023; B29C 49/48; B29C 47/56; B65D 1/0215; B65D 1/12; B65D 81/3846; C08J 9/06; C08J 9/122; C08J 2323/06; C08J 2323/08; C08J 2423/06; B29B 11/14; B29B 2911/14173; B29B 11/10; B29B 2911/14053; B29B 2911/14066; B29B 2911/14093; B32B 7/02; B32B 27/08; B32B 27/306; B32B 27/32; B32B 2439/70; B32B 2911/14173; B32B 11/10; B32B 2911/14053; B32B 2911/14066; B32B 2911/14093; B32B 2250/242; B32B 2250/246; B32B 2262/0253; B32B 2262/14; B32B 2270/00; B32B 2307/4026; B32B 2307/71; B32B 2307/72; B32B 2307/7242; B32B 2439/60; B29K 2023/0633; B29K 2023/065; B29K 2223/00; B29K 2105/12; B29K 2105/0058; B29K 2105/0005; B29K 2995/0063; B29K 2105/04; B29L 2031/712; B29L 2023/00; B29L 2031/7158; B29L 2209/001
See application file for complete search history.

(56) References Cited

U.S. PATENT DOCUMENTS 3,221,954 A 12/1965 Lux
3,290,198 A 12/1966 Lux
(Continued)

FOREIGN PATENT DOCUMENTS

CN 1484602 3/2004
CN 1984763 6/2007
(Continued)

OTHER PUBLICATIONS

International Search Report and Written Opinion, International Application No. PCT/US2016/020844, dated Apr. 14, 2016.
(Continued)

*Primary Examiner* — Nathan M Nutter
(74) *Attorney, Agent, or Firm* — Barnes & Thornburg LLP

(57) ABSTRACT

A formulation for producing a polymeric material including high-density polyethylene, a chemical blowing agent, and other optional components is described.

29 Claims, 6 Drawing Sheets

(51) Int. Cl.

| | | |
|---|---|---|
| *B29C 49/22* | (2006.01) | |
| *B65D 81/38* | (2006.01) | |
| *C08J 9/06* | (2006.01) | |
| *C08J 9/12* | (2006.01) | |
| *B29B 11/14* | (2006.01) | |
| *B29C 47/06* | (2006.01) | |
| *B32B 5/20* | (2006.01) | |
| *B32B 1/02* | (2006.01) | |
| *B32B 1/00* | (2006.01) | |
| *B65D 1/02* | (2006.01) | |
| *B65D 1/12* | (2006.01) | |
| *B32B 7/02* | (2006.01) | |
| *B32B 27/08* | (2006.01) | |
| *B32B 27/30* | (2006.01) | |
| *B32B 27/32* | (2006.01) | |
| *B29K 23/00* | (2006.01) | |
| *B29L 31/00* | (2006.01) | |
| *B29B 11/10* | (2006.01) | |
| *B29K 105/00* | (2006.01) | |
| *B29K 105/12* | (2006.01) | |
| *B29K 223/00* | (2006.01) | |
| *B29L 23/00* | (2006.01) | |
| *B29C 47/56* | (2006.01) | |
| *B29C 47/00* | (2006.01) | |
| *B29K 105/04* | (2006.01) | |
| *B29C 49/48* | (2006.01) | |
| *B29C 49/62* | (2006.01) | |
| *B29L 9/00* | (2006.01) | |

(52) U.S. Cl.
CPC ... *B32B 2270/00* (2013.01); *B32B 2307/4026* (2013.01); *B32B 2307/71* (2013.01); *B32B 2307/72* (2013.01); *B32B 2307/7242* (2013.01); *B32B 2439/60* (2013.01); *B32B 2439/70* (2013.01); *C08J 2323/06* (2013.01); *C08J 2323/08* (2013.01); *C08J 2423/06* (2013.01)

(56) References Cited

U.S. PATENT DOCUMENTS

| | | | |
|---|---|---|---|
| 3,892,828 A | 7/1975 | Weatherly | |
| 3,981,412 A | 9/1976 | Asmus | |
| 4,047,868 A | 9/1977 | Kudo | |
| 4,206,166 A | 6/1980 | Hayashi | |
| 4,220,730 A | 9/1980 | Coyne | |
| 4,264,672 A * | 4/1981 | Taylor-Brown et al. ............... B29C 55/06 264/321 | |
| 4,435,344 A | 3/1984 | Iioka | |
| 4,468,435 A | 8/1984 | Shimba et al. | |
| 4,479,989 A | 10/1984 | Mahal | |
| 4,867,664 A | 9/1989 | Fukuhara | |
| 4,990,382 A | 2/1991 | Weissenstein | |
| 5,037,285 A | 8/1991 | Kudert | |
| 5,055,022 A | 10/1991 | Hirschberger | |
| 5,328,651 A | 7/1994 | Gallagher | |
| 5,332,121 A | 7/1994 | Schmidt | |
| 5,405,667 A | 4/1995 | Heider | |
| 5,574,074 A | 11/1996 | Zushi | |
| 5,575,965 A | 11/1996 | Caronia | |
| 5,598,940 A | 2/1997 | Finkelstein | |
| 5,601,200 A | 2/1997 | Finkelstein | |
| 5,628,453 A | 5/1997 | MacLaughlin | |
| 5,688,572 A | 11/1997 | Slat | |
| 5,857,572 A | 1/1999 | Bird | |
| 5,916,926 A | 6/1999 | Cooper | |
| 5,927,525 A | 7/1999 | Darr | |
| 5,952,423 A | 9/1999 | Shang | |
| 6,053,214 A | 4/2000 | Sjoberg et al. | |
| 6,221,925 B1 | 4/2001 | Constant | |
| 6,284,810 B1 | 9/2001 | Burnham | |
| 6,323,251 B1* | 11/2001 | Perez et al. ............... B41M 1/04 428/343 | |
| 6,432,525 B1 | 8/2002 | Gokuraku | |
| 6,444,149 B1 | 9/2002 | Valentinsson | |
| 6,593,384 B2 | 7/2003 | Anderson | |
| 6,616,434 B1 | 9/2003 | Burnham | |
| 6,706,223 B1 | 3/2004 | Anderson | |
| 6,811,843 B2 | 11/2004 | DeBraal | |
| 6,875,484 B1 | 4/2005 | Kogure | |
| 6,921,571 B2 | 7/2005 | Funakoshi | |
| 6,986,922 B2 | 1/2006 | Hesse | |
| 7,014,801 B2 | 3/2006 | Imanari | |
| 7,169,338 B2 | 1/2007 | Imanari | |
| 7,462,307 B2 | 12/2008 | Hesse | |
| 7,588,808 B2 | 9/2009 | Hutchinson | |
| 7,588,810 B2 | 9/2009 | Semersky | |
| 7,704,440 B2 | 4/2010 | Brandner | |
| 7,759,267 B2 | 7/2010 | Conover | |
| 7,871,558 B2 | 1/2011 | Merical | |
| 7,973,100 B2 | 7/2011 | Wada | |
| 8,061,540 B2 | 11/2011 | Toyoda | |
| 8,061,541 B2 | 11/2011 | Trumpp | |
| 8,124,203 B2 | 2/2012 | Semersky | |
| 8,137,600 B2 | 3/2012 | Pierick | |
| 8,263,198 B2 | 9/2012 | Carvell | |
| 8,342,420 B2 | 1/2013 | Roberts, Jr. | |
| 8,397,932 B2 | 3/2013 | Ichikawa | |
| 8,414,823 B2 | 4/2013 | Rudiger | |
| 8,435,615 B2 | 5/2013 | Tsuchida | |
| 8,535,598 B2 | 9/2013 | Imanari | |
| 9,447,248 B2* | 9/2016 | Sun et al. ............... C08J 9/122 | |
| 2002/0006975 A1 | 1/2002 | Welsh | |
| 2002/0172739 A1 | 11/2002 | Anderson | |
| 2003/0065097 A1 | 4/2003 | DeGroot | |
| 2003/0127765 A1 | 7/2003 | Weiland | |
| 2004/0013830 A1 | 1/2004 | Nonomura | |
| 2004/0062885 A1 | 4/2004 | Imanari | |
| 2004/0086703 A1 | 5/2004 | Semersky | |
| 2004/0147625 A1* | 7/2004 | Dostal et al. ............ B27N 3/005 521/79 | |
| 2005/0009973 A1 | 1/2005 | Lee | |
| 2006/0091576 A1 | 5/2006 | Takase | |
| 2006/0142495 A1 | 6/2006 | Lalho | |
| 2006/0205833 A1 | 9/2006 | Martinez | |
| 2008/0114131 A1 | 5/2008 | Harris | |
| 2008/0125547 A1 | 5/2008 | Swogger | |
| 2008/0246193 A1 | 10/2008 | Smits | |
| 2008/0261016 A1 | 10/2008 | Tamada | |
| 2009/0269566 A1 | 10/2009 | Eichbauer | |
| 2010/0196641 A1 | 8/2010 | DeVos | |
| 2010/0215879 A1 | 8/2010 | Dooley | |
| 2010/0227092 A1 | 9/2010 | Semersky | |
| 2010/0282759 A1 | 11/2010 | Eckhardt | |
| 2011/0129656 A1* | 6/2011 | Zur et al. ............... B29C 44/34 428/219 | |
| 2011/0172363 A1 | 7/2011 | Share | |
| 2011/0180509 A1 | 7/2011 | Hutchinson | |
| 2011/0250384 A1 | 10/2011 | Sumi | |
| 2012/0024459 A1 | 2/2012 | Igarashi | |
| 2012/0061886 A1 | 3/2012 | Sumi | |
| 2012/0076965 A1 | 3/2012 | Silvers | |
| 2012/0103858 A1 | 5/2012 | Schmidt | |
| 2012/0318805 A1 | 12/2012 | Leser | |
| 2012/0318859 A1 | 12/2012 | Leser | |
| 2013/0052385 A1 | 2/2013 | Leser | |
| 2013/0059102 A1 | 3/2013 | Torchio | |
| 2013/0085244 A1 | 4/2013 | Zhao | |
| 2013/0143975 A1 | 6/2013 | Cassidy | |
| 2014/0037880 A1 | 2/2014 | Siddhamalli | |
| 2015/0014879 A1 | 1/2015 | Sun | |
| 2015/0061194 A1 | 3/2015 | Sun | |

(56) References Cited

U.S. PATENT DOCUMENTS

| | | | |
|---|---|---|---|
| 2016/0089852 | A1 | 3/2016 | Lindenfelzer |
| 2016/0355659 | A1* | 12/2016 | Sun et al. ............... C08J 9/122 |

FOREIGN PATENT DOCUMENTS

| | | |
|---|---|---|
| CN | 102313084 | 1/2012 |
| CN | 102762350 | 10/2012 |
| EP | 1057608 | 4/2002 |
| EP | 1472087 | 4/2006 |
| EP | 1741744 | 1/2007 |
| EP | 0851805 | 12/2008 |
| EP | 1040158 | 4/2012 |
| EP | 1749635 | 9/2012 |
| EP | 2323829 | 10/2012 |
| EP | 2141000 | 2/2014 |
| JP | 4278340 | 10/1992 |
| JP | 04278340 | 10/1992 |
| JP | 404278340 A | 10/1992 |
| JP | 410000748 A | 1/1998 |
| JP | 2001139717 A | 5/1999 |
| JP | 2001138378 A | 5/2001 |
| JP | 2004137377 | 5/2004 |
| JP | 2004137377 A | 5/2004 |
| JP | 2005290329 A | 10/2005 |
| JP | 2008213491 A | 9/2008 |
| JP | 2012526006 | 10/2012 |
| JP | 2013203886 | 10/2013 |
| WO | 2003066320 | 8/2003 |
| WO | 2010015673 | 2/2010 |
| WO | 2012174567 | 12/2012 |
| WO | 2012174567 A2 | 12/2012 |
| WO | 2012174568 | 12/2012 |
| WO | 2013032552 | 3/2013 |
| WO | 2012174567 A3 | 4/2013 |
| WO | 2014099335 | 6/2014 |
| WO | 2015024018 | 2/2015 |

OTHER PUBLICATIONS

International Search Report and Written Opinion, International Application No. PCT/US2016/020674, dated Apr. 18, 2016.
Office Action dated Jun. 15, 2016 for U.S. Appl No. 14/787,901.
Extended European Search Report for European App. No. 14840353.8 dated Mar. 17. 2017, 6 pages.
Extended European Search Report for European App. No. 14838960.4 dated Mar. 17, 2017, 9 pages.
Extended European Search Report for European App. No. 14840262 dated Mar. 23, 2017, 8 pages.
New Zealand Examination Report for New Zealand Patent App. No. 712687 dated Mar. 30, 2017, 10 pages.
Office Action dated Apr. 21, 2017 for U.S. Appl. No. 14/475,411.
Taiwan Search Report for Taiwan Application No. 103109790 dated Apr. 20, 2017, 9 pages.
Extended European Search Report for European App. No. 14840734.9 dated Apr. 4, 2017, 10 pages.
Australian Examination Report for Australian App. No. 2014286957 dated May 2, 2017, 3 pages.
Office Action dated May 1, 2017 for U.S. Appl. No. 14/211,533.
Unilever Launches Breakthrough Packaging Technology That Uses 15% Less Plastic, Unilever (Apr. 24, 2014), http://www.unilever.com/mediacentre/pressreleases/2014/Unileverlaunches-breakthroughpackagingtechnologythatuses15lessplastic.aspx (2 pages).
Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).
US Office Action dated Sep. 15, 2016, for U.S. Appl. No. 15/239,894; 8 pages.
Advisory Action dated Jun. 1, 2017 for U.S. Appl. No. 15/239,894; (pp. 1-6).
Australian Patent Examination Report for Australian App. No. 2014239318 dated Nov. 25, 2016, 4 pages.
Chinese Office Action for Chinese App. No. 201480047976.2 dated Dec. 9, 2016, 11 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Chinese Office Action for Chinese App. No. 201480047578.0 dated Nov. 30, 2016, 10 pages.
Office Action dated Mar. 14, 2017 for U.S. Appl. No. 14/475,266.
Office Action dated Mar. 21, 2017 for U.S. Appl. No. 14/475,411.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report and Written Opinion dated Jul. 18, 2014, relating to International Application No. PCT/US2014/027551.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Office Action dated May 11, 2015 for U.S. Appl. No. 14/1331,066.
International Search Report and Written Opinion related to International Application No. PCT/US2014/053666 dated Oct. 29, 2014.
Cheng et al., "Improving processability of polyethylenes by radiation-induced long chain branching," Radiation Physics and Chemistry 79 (2009) 563-566.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.
Office Action dated Aug. 15, 2016 for U.S. Appl. No. 14/468,789.
Office Action dated Aug. 12, 2016 for U.S. Appl. No. 14/475,096.
Office Action dated Jul. 10, 2017 for U.S. Appl. No. 15/239,894; (pp. 1-10).
Chinese Office Action for Chinese App. No. 201480047578.0 dated Jul. 4, 2017, 5 pages.
Chinese Office Action for Chinese App. No. 201480047978.1 dated Jul. 21, 2017, 11 pages.
Chinese Office Action for Application Serial No. 201480021009.9, dated Aug. 7, 2017 including English language summary, 12 pages.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Chinese App. No. 201480047976.2 dated Aug. 22, 2017, 15 pages.
Dongwu Yang, Plastic Material Selection Technology, Light Industry Press, Jan. 2008, 1 page.

(56) References Cited

OTHER PUBLICATIONS

Chinese Office Action for Application Serial No. 2014800210099, dated Jan. 2, 2018 including English language summary, 6 pages.
Office Action dated Jan. 17, 2018 for U.S. Appl. No. 15/591,355; (pp. 1-5)
Chinese Office Action for Chinese App. No. 201480047578.0 dated Jan. 24, 2018, 10 pages.

* cited by examiner

POLYMERIC MATERIAL FOR CONTAINER

PRIORITY CLAIM

This application claims priority under 35 U.S.C. § 119(e) to U.S. Provisional Application No. 62/128,195, filed Mar. 4, 2015, and U.S. Provisional Application No. 62/279,177, filed Jan. 15, 2016, each of which are expressly incorporated by reference herein.

BACKGROUND

The present disclosure relates to polymeric materials that can be formed to produce a container, and in particular, polymeric materials that insulate. More particularly, the present disclosure relates to polymer-based formulations that can produce an insulated non-aromatic polymeric material.

SUMMARY

According to the present disclosure, a polymeric material includes a polymeric resin and at least one cell-forming agent. In illustrative embodiments, a blend of polymeric resins and cell-forming agents is mixed and extruded or otherwise formed to produce an insulated cellular non-aromatic polymeric material. The insulated cellular non-aromatic polymeric material has a low density but is resistant to and/or can withstand impact forces. The low density, insulated cellular non-aromatic polymeric material can be used for improved containers.

In illustrative embodiments, an insulative cellular non-aromatic polymeric material comprises a cell-forming agent and at least one high-density polyethylene-based base resin. The cell-forming agent can include a chemical nucleating agent and a physical blowing agent. In an embodiment, a base resin can be HDPE, which can be virgin HDPE, regrind, or mixtures thereof.

In illustrative embodiments, the insulative cellular non-aromatic polymeric material has a density of less than about 0.9 grams per cubic centimeter. In illustrative embodiments, the insulative cellular non-aromatic polymeric material has a density in a range of about 0.2 grams per cubic centimeter to about 0.5 grams per cubic centimeter. In illustrative embodiments, the insulative cellular non-aromatic polymeric material has a density in a range of about 0.25 grams per cubic centimeter to about 0.4 grams per cubic centimeter. In illustrative embodiments, the insulative cellular non-aromatic polymeric material has a density of about 0.35 grams per cubic centimeter.

In illustrative embodiments, a polyethylene-based formulation in accordance with the present disclosure is heated and extruded to produce a tubular extrudate (in an extrusion process) that can be formed to provide a strip of insulative cellular non-aromatic polymeric material. A physical blowing agent in the form of an inert gas is introduced into a molten material before the tubular extrudate is formed. In an illustrative embodiment, a throughput system includes a multi-parison drop. For example, an extrusion line starts as a single line and then splits into 2, 3, 4, 5, or more lines for multiple parison drops. In illustrative embodiments, an insulative cellular non-aromatic polymeric material produced in accordance with the present disclosure can be formed to produce an insulative cup or container. Polyethylene resin is used to form the insulative cellular non-aromatic polymeric material in illustrative embodiments.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
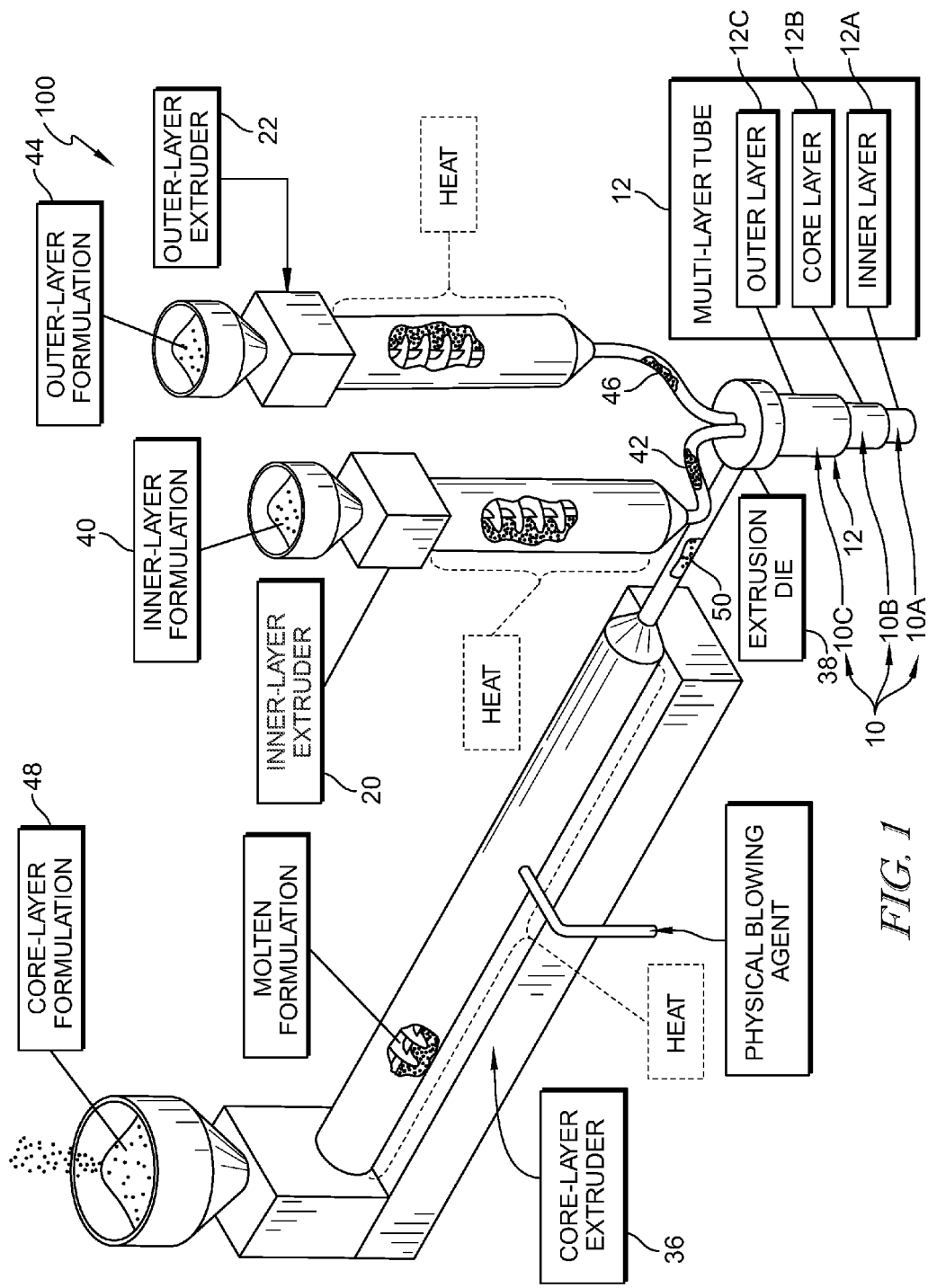
FIG. 1 is a perspective and diagrammatic view of the co-extrusion system used to prepare the insulative cellular non-aromatic polymeric material, showing that the co-extrusion system includes an outer-layer extruder configured to receive an outer-layer formulation and provide an outer-layer parison, an inner-layer extruder configured to receive an inner-layer formulation and provide an inner-layer parison, a core-layer extruder configured to receive a core-layer formulation and provide a core-layer parison, and a co-extrusion die coupled to each of the extruders to receive the associated parisons and configured to extrude the inner-layer, the core-layer, and the outer-layer parisons to establish a multi-layer tube.

A polymeric material 10 according to the present disclosure can be used to form insulative multi-layer containers 14, 214, 314 as shown for example, in FIGS. 1, 5, 7, and 8. As described herein, a core polymeric material 10B, sometimes called an insulative cellular non-aromatic polymeric material, includes at least one cell-forming agent and a polymeric resin (i.e., a thermoplastic polyolefin). To form core polymeric material 10B, a blend of polymeric resins and cell-forming agents are combined via blending and extruded, as shown for example as extrusion process 100 in FIG. 1. Polymeric material 10 can be co-extruded, as shown in FIG. 1, to form a multi-layer tube 12, which can then be blow molded to form insulative multi-layer containers 14, 214, 314.

Figure 2:
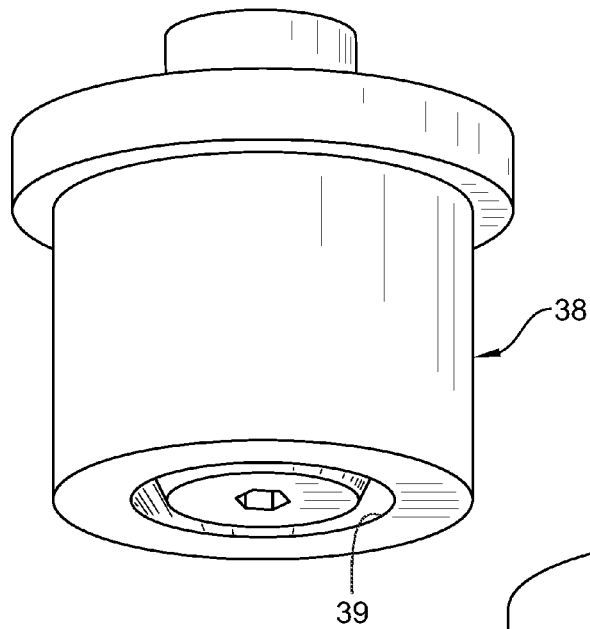
FIG. 2 is a partial perspective view taken from below the co-extrusion die of the co-extrusion system of FIG. 1 showing that the co-extrusion die includes an annular aperture configured to extrude the multi-layer tube.
Figure 3:
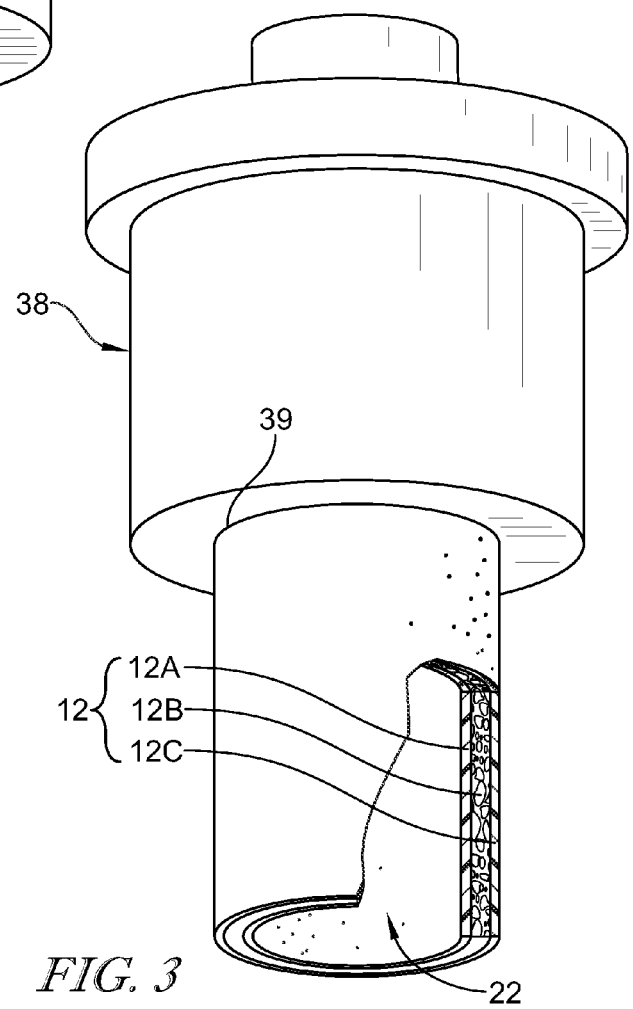
FIG. 3 is a view similar to FIG. 2 after co-extrusion of the insulative cellular non-aromatic polymeric material as a multi-layer tube has begun with portions of the multi-layer tube broken away to reveal that the inner layer is spaced apart from the outer layer and that the core layer is located therebetween.
Figure 6:
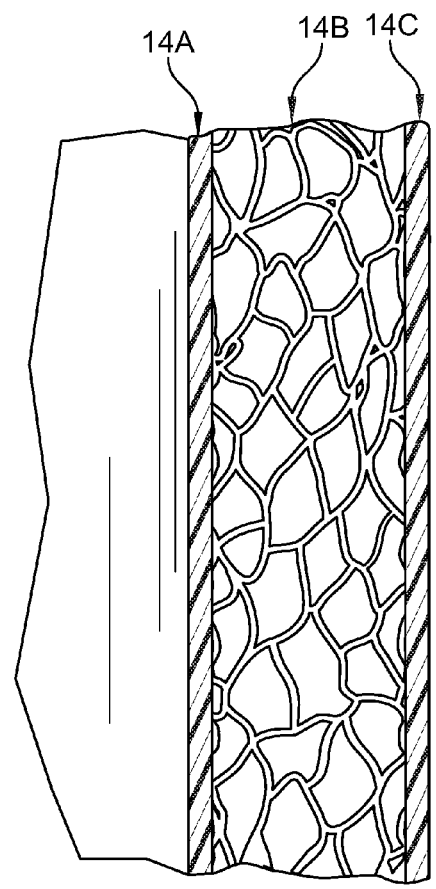
FIG. 6 is a sectional view taken along line 6-6 of FIG. 5 showing that the multi-layer container includes a side wall including the inner layer, the outer layer spaced apart from the inner layer, and a compressed core layer located therebetween and showing that some of the expanded cells have collapsed along the inner and outer layers to cause the compressed core layer to have a relatively greater density than the core layer of the multi-form tube.
Figure 7:
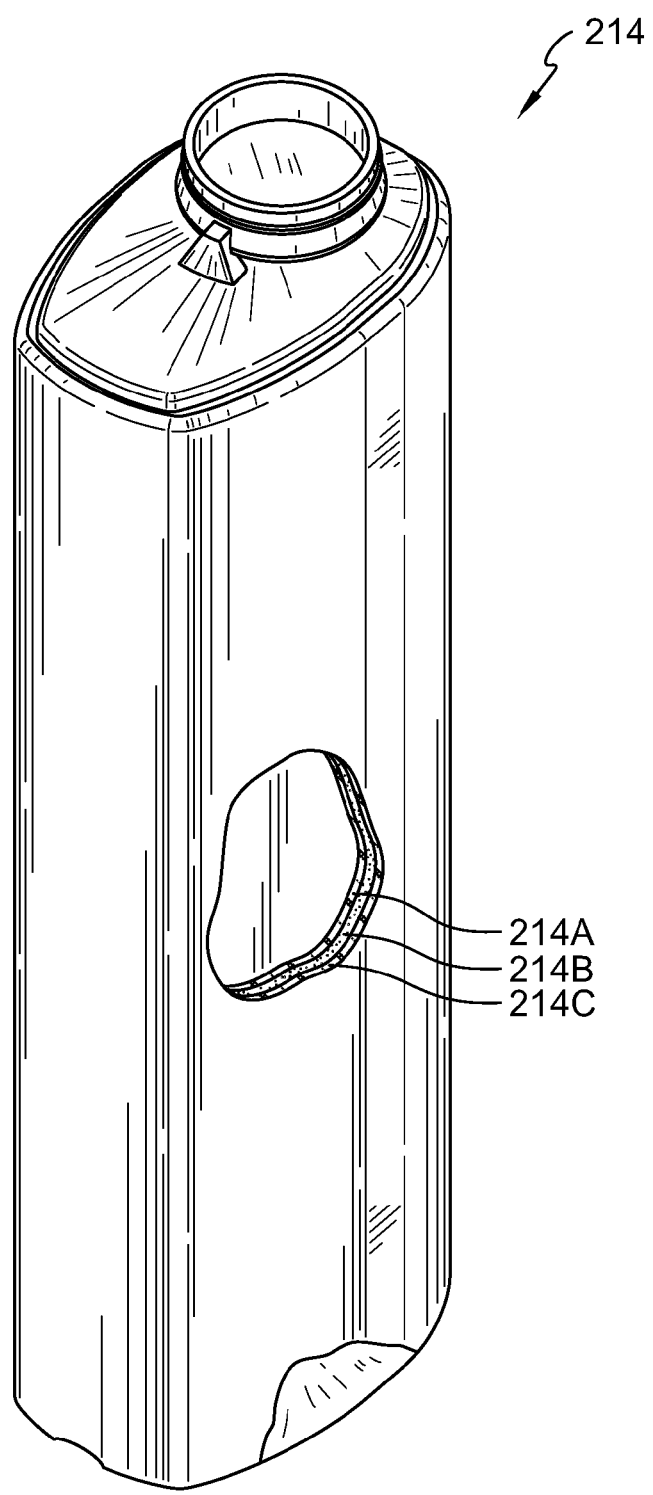
FIG. 7 is a perspective view of a multi-layer container made from insulative cellular non-aromatic material in accordance with the present disclosure with portions broken away to reveal that the multi-layer container includes an inner layer, a core layer, and an outer layer.

Co-extrusion process 100 can be used to form multi-layer tubes 12, sometimes called a parison, that include an inner layer 12A, a core layer 12B, and an outer layer 12C, each formed of a polymeric material 10A, 10B, 10C, as shown in FIG. 1. The molten formulations 42, 46, 50 for each of inner layer 12A, core layer 12B, and outer layer 12C pass through the extruders 20, 22, 36 to an annular extrusion die 38, as shown in FIGS. 1 and 3. The annular extrusion die 38 is configured to locate inner layer 12A around an interior space 23 and to locate core layer 12B between inner layer 12A and outer layer 12C through an annular aperture 39, as shown in FIG. 2. While three formulations are discussed herein, more or less formulations may be fed to associated extruders to produce a multiple layer tube having more or less layers. Reference is hereby made to U.S. patent application Ser. No. 14/475,411, filed Sep. 2, 2014 and titled MULTI-LAYER TUBE AND PROCESS OF MAKING THE SAME for disclosure relating to co-extrusion and multi-layer tube formation, which application is hereby incorporated in its entirety Multi-layer tube 12 can be blow molded to form multi-layer containers 14, 214, 314 as shown in FIGS. 5-8. As an example, multi-layer tube 12 can be inserted into a mold and have air forced into interior space 23 to cause the multi-layer tube 12 to expand to fit an interior surface of the mold. Throughout this process, the relative locations of polymeric material 10A, 10B, 10C of multi-layer tube 12 are maintained and form the inner layer 14A, core layer 14B, and outer layer 14C of multi-layer container 14 once blow molded, as shown in FIG. 6. Reference is hereby made to U.S. patent application Ser. No. 14/475,266, filed Sep. 2, 2014 and titled CONTAINER AND PROCESS FOR MAKING THE SAME for disclosure relating to container forming processes, which application is hereby incorporated in its entirety.

In one exemplary embodiment, polymeric material 10 comprises a formulation that includes at least one polymeric resin. The polymeric material 10 may include one or more base resins. As an example, core polymeric material 10B comprises at least one polyethylene base resin and one or more cell-forming agents. As described herein, the core polymeric material 10B may be called an insulative cellular non-aromatic polymeric material. Reference is hereby made to U.S. patent application Ser. No. 14/331,066, filed Jul. 14, 2014 and titled POLYMERIC MATERIAL FOR CONTAINER for disclosure relating to possible formulation options, which application is hereby incorporated in its entirety.

Cell-forming agents provide a means for decreasing the density of the polymeric material while maintaining advantageous physical properties. Cell-forming agents can be chemical agents, physical agents, or combinations of both. Cell-forming agents can be physical blowing agents, chemical blowing agents, or combinations of both. Cell-forming agents can include nucleating agents.

Insulative cellular material can be co-extruded with additional layers that have advantageous properties. For example, inner layer polymeric material 10A and outer-layer polymeric material 10C can contain a reinforcing fiber, a hardener, a color, or a combination thereof.

In one example, the base resin is high-density polyethylene (HDPE). A HDPE base resin can be a HDPE homopolymer or a HDPE copolymer. In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron-beam modified to provide long-chain branching and a melt index of about 0.25 g/10 min. Another example of a unimodal, high-melt strength HDPE is EQUISTAR® ALATHON® H5520 HDPE copolymer (available from Lyondell Chemical Company) that has been electron-beam modified to have long-chain branching and a melt index of about 0.25 g/10 min. Another example of a suitable unimodal HDPE is FORMOLENE® HB5502F HDPE hexene copolymer (available from Formosa Plastics Corporation). In another suitable embodiment of a HDPE hexene copolymer, the HDPE is Marlex® HHM 5502BN HDPE hexene copolymer (Chevron Phillips Chemical Company, The Woodlands, Tex.). In some embodiments, the HDPE has a melt index from about 0.1 g/10 min to about 0.4 g/10 min. In an example the HDPE has a melt index between 0.7 g/10 min and 0.9 g/10 min. In another example, the HDPE resin is DOW DMDA 6400 NT7.

Long-chain branching refers to the presence of polymer side chains (branches) that have a length that is comparable or greater than a length of the backbone which is coupled to the polymer side chains. Long-chain branching creates viscoelastic chain entanglements (polymer entanglements) that hamper flow during extensional or oriented stretching and provide for a strain hardening phenomenon.

The strain hardening phenomenon may be observed through two analytical methods. The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long-chain branching will exhibit LVE flow characteristics. In comparison, long-chain branched polymers will exhibit strain hardening and which causes a deviation from the LVE flow characteristics of the virgin polymer providing the hook formation under the same test conditions.

The second analytical method used to observe the presence of long-chain branching is evaluating melt strength data as tested per ISO 16790 which is incorporated by reference herein in its entirety. An amount of melt strength is known to be directly related to the presence of long-chain branching when compared to similar virgin polymers lacking long-chain branching. By way of example, Borealis DAPLOY™ WB 140HMS Polypropylene (PP) (available from Borealis AG) is compared to other polymers having similar molecular weight, polydispersity index, and other physical characteristics. The DAPLOY™ WB 140HMS PP has a melt strength which exceeds about 36 cN while other similar PP resins lacking long-chain branching have a melt strength of less than about 10 cN.

Melt flow index (MFI) is an indirect measure of the viscosity of a polymer when molten. The index is defined as the mass of polymer melt that will flow through a capillary of a specific diameter and length by a pressure applied in 10 minutes, as described in ASTM D1238. For example, the Marlex® HHM 5502BN HDPE hexene copolymer (Chevron Phillips) has a melt flow index of 0.35 g/10 min per ASTM D1238. A larger melt index value indicates a lower viscosity. Higher molecular weight polymers will be more viscous and less will flow under the same conditions so the melt index will be a smaller number.

In certain exemplary embodiments, the formulation may include two base resins that are HDPE. In some embodiments the HDPE base resin may include multiple HDPE resins. One illustrative example of the formulation includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, a formulation may include both electron-beam modified EQUISTAR® ALATHON® H5520 and FORMOLENE® HB5502F HDPE. In such an embodiment, the EQUISTAR® ALATHON® H5520 provides higher melt strength which increases foaming potential, and has less flexural modulus or brittleness. The FORMOLENE® HB5502F HDPE provides wide unimodal polydispersity index of the molecular weight distribution and maximizes economic advantage.

In another example, a formulation includes about 50% electron-beam modified EQUISTAR® ALATHON® H5520 and about 50% FORMOLENE® HB5502F HDPE. The combination provides a material having drop resistance capability associated with a non-modified HDPE resin and increased melt strength of an electron-beam modified long-chain branched HDPE. Depending on the desired characteristics, the percentage of the HDPE base resin between the two HDPE base resins may be varied, e.g., 25%/75%, 30%/70%, 35%/65%, 40%/60%, 45%/55%, 50%/50%, etc., by weight of the base resins. In an embodiment, a formulation includes three HDPE base resins. Again, depending on the desired characteristics, the percentage of three HDPE copolymers can be varied, 33%/33%/33%, 30%/30%/40%, 25%/25%/50%, etc., by weight of the base resins.

In certain exemplary embodiments, the formulation may include two base resins wherein the first base resin is an HDPE resin and the second base resin is a Low-Density Polyethylene (LDPE). In an example the LDPE resin has a melt index between 0.7 g/10 min and 0.9 g/10 min as measured by ASTM D1238. In another example, the LDPE resin is DOW™ LDPE 692 LDPE HEALTH+™ available from The Dow Chemical Company®.

In certain exemplary embodiments, the formulation may include two base resins wherein the first base resin is an HDPE resin and the second base resin is a Low-Density Polyethylene (LDPE) resin. Without being bound by theory, LDPE may be added to improve the compression resistance of the core layer during container-molding process 100. In an example the HDPE has a melt index between 0.7 g/10 min and 0.9 g/10 min. In another example, the HDPE resin is DOW DMDA 6400 NT7. In an example the LDPE resin has a melt index between 0.7 g/10 min and 0.9 g/10 min as measured by ASTM D1238. In another example, the LDPE resin is DOW™ LDPE 692 LDPE HEALTH+™ available from The Dow Chemical Company®.

In an illustrative example, the formulation comprises a blend of a certain percentage by weight of an HDPE resin and the remainder of the blend is an LDPE resin. In embodiments described herein, the percentage amount of HDPE in the blend may be 100%, 90%, 80%, 70%, 60%, 50%, 40%, 30%, 20%, 10% or 0 and the remainder of the blend is LDPE. It is within the present disclosure for the amount of HDPE in the blend to fall within one of many different ranges. In a set of ranges, the amount of HDPE in the blend can be about 0% to about 100%, about 20% to about 100%, about 40% to about 100%, about 60% to about 100%, about 70% to about 100%, about 80% to about 100%, about 80% to about 95%, and about 85% to about 95% of the blend. Polymeric material as disclosed herein includes at least one base resin. In illustrative embodiments, the at least one base resin can be HDPE. The amount of a base resin may be one of several different values or fall within one of several different ranges. It is within the scope of the present disclosure to select an amount of base resin to be one of the following values: about 20%, about 25%, about 30%, about 35%, about 40%, about 45%, about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, about 99.5%, about 99.9%, and about 100% of the total formulation of the polymeric layer by weight percentage. It is within the present disclosure for the amount of base resin in the formulation to fall within one of many different ranges. In a first set of ranges, the range of base resin is one of the following ranges: about 20% to about 99.9%, about 25% to about 99.9%, about 50% to about 99.9%, about 85% to about 99.9%, about 90% to about 99.9%, about 95% to about 99.9%, about 98% to about 99.9%, and about 99% to about 99.9% of the total formulation of the polymeric layer by weight percentage. In a second set of ranges, the range of base resin is one of the following ranges: about 85% to about 99%, about 85% to about 98%, about 85% to about 95%, and about 85% to about 90% of the total formulation of the polymeric layer by weight percentage. In a third set of ranges, the range of base resin is one of the following ranges: about 90% to about 99%, and about 95% to about 98% of the total formulation by weight percentage. Each of these values and ranges is embodied in Examples 1 to 33.

In some embodiments, the core-layer formulation comprises an impact modifier to improve the performance of the container. In an embodiment the core-layer formulation comprises about 5% of an impact modifier. In some embodiments, the core-layer formulation comprises Vistamaxx™ available from the ExxonMobil™ Corporation.

In an embodiment, the base resin can be 100% virgin base resin. In an embodiment, the base resin can be a mixture of virgin base resin and regrind base resin. For example, the base resin can be about 100%, about 90%, about 80%, about 75%, about 70%, about 60%, about 50%, about 40%, about 30%, about 25%, about 20%, or about 10% virgin base resin with the remainder being a regrind. In an exemplary embodiment, the base resin is about 50% virgin HDPE and about 50% regrind.

In some embodiments, the HDPE base resin comprises up to about 90% regrind, up to about 80% regrind, up to about 60% regrind, up to about 40% regrind, up to about 20% regrind, about 20% to about 90% regrind, about 30% to about 90% regrind, about 40% to about 90% regrind, about 50% to about 90% regrind, about 20% to about 75% regrind, about 30% to about 75% regrind, about 40% to about 75% regrind, about 50% to about 75% regrind, about 20% to about 60% regrind, about 30% to about 60% regrind, about 40% to about 60% regrind, or about 50% to about 60% regrind. The regrind may be first pass regrind, second pass regrind, third pass regrind, and the like.

The term polymeric layer refers to a polymeric monolayer, a polymeric core layer in a multi-layer material, or a non-core polymeric layer in a multi-layer material.

The formulation used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical agent that provides sites for cells to form in a molten material. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Formulations used to produce insulative cellular non-aromatic polymeric materials may include one or more cell-forming agents. The amount of a nucleating agent may be one of several different values or fall within one of several different ranges. It is within the scope of the present disclosure to select an amount of a nucleating agent to be one of the following values: about 0%, about 0.05%, about 0.1%, about 0.2%, about 0.3%, about 0.5%, about 1%, about 1.5%, about 2%, about 3%, about 4%, about 5%, about 6%, about 7%, about 8%, about 9%, about 10%, about 11%, about 12%, about 13%, about 14%, and about 15%, of the total formulation of the polymeric layer by weight percentage. It is within the scope of the present disclosure for the amount of a nucleating agent in the formulation to fall within one of many different ranges. In a first set of ranges, the percentage (w/w) range of a nucleating agent is one of the following ranges: about 0% to about 15%, about 0.05% to about 15%, about 0.1% to about 15%, about 0.25% to about 15%, about 0.5% to about 15%, about 0.75% to about 15%, about 1% to about 15%, about 2% to about 15%, about 3% to about 15%, about 4% to about 15%, and about 5% to about 15% of the total formulation of the polymeric layer by weight percentage. In a second set of ranges, the percentage (w/w) range of a nucleating agent is one of the following ranges: about 0.05% to about 10%, about 0.1% to about 10%, about 0.25% to about 10%, about 0.5% to about 10%, about 0.75% to about 10%, about 1% to about 10%, about 2% to about 10%, about 3% to about 10%, about 4% to about 10%, and about 5% to about 10% of the total formulation of the polymeric layer by weight percentage. In a third set of ranges, the percentage (w/w) range of a nucleating agent is one of the following ranges: about 0.05% to about 5%, about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation of the polymeric layer by weight percentage.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

Formulations used to produce insulative cellular non-aromatic polymeric materials may include one or more cell-forming agents. The amount of a physical nucleating agent may be one of several different values or fall within one of several different ranges. It is within the scope of the present disclosure to select an amount of physical nucleating agent, such as talc, to be one of the following values: about 0%, about 0.05%, about 0.1%, about 0.3%, about 0.5%, about 1%, about 2%, about 3%, about 4%, about 5%, about 6%, and about 7% of the total formulation of the polymeric layer by weight percentage. It is within the scope of the present disclosure for the amount of a physical nucleating agent in the formulation to fall within one of many different ranges. In a first set of ranges, the range of a physical nucleating agent is one of the following ranges: about 0% to about 7% (w/w), about 0.1% to about 7%, about 0.25% to about 7%, about 0.5% to about 7%, about 0.75% to about 7%, about 1.0% to about 7%, about 1.25% to about 7%, about 1.5% to about 7%, about 1.75% to about 7%, about 2.0% to about 7%, about 2.25% to about 7%, about 2.5% to about 7%, about 3% to about 7%, about 4% to about 7%, about 5% to about 7%, and about 6% to about 7% of the total formulation of the polymeric layer. In a second set of ranges, the range of a physical nucleating agent is one of the following ranges: about 0% to about 6%, about 0% to about 5%, about 0% to about 4%, about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer. In a third set of ranges, the range of a physical nucleating agent is one of the following ranges: about 0.1% to about 6%, about 0.5% to about 5%, about 1% to about 4%, and about 2% to about 3% of the total formulation of the polymeric layer. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

Formulations used to produce insulative cellular non-aromatic polymeric materials can include a chemical nucleating agent. The amount of a chemical nucleating agent may be one of several different values or fall within one of several different ranges. It is within the scope of the present disclosure to select an amount of a chemical nucleating agent and be one of the following values: about 0.1%, about 0.25%, about 0.5%, about 0.75%, about 1%, about 1.5%, about 2%, about 2.5%, about 3%, about 3.5%, about 4%, about 5%, 1 about 0%, and about 15% of the total formulation by weight percentage. It is within the scope of the present disclosure for the amount of a chemical nucleating agent in the formulation to fall within one of many different ranges. In a first set of ranges, the range of a chemical nucleating agent is one of the following ranges: about 0.1% to about 15%, about 0.25% to about 15%, about 0.5% to about 15%, about 1% to about 15%, about 1.5% to about 15%, about 2% to 1 about 5%, about 2.5% to about 15%, about 3% to about 15%, about 3.5% to about 15%, about 4% to about 15%, about 4.5% to about 15%, and about 5% to about 15% of the total formulation by weight percentage. In a second set of ranges, the range of a chemical nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 2.5% to about 10%, about 3% to about 10%, about 3.5% to about 10%, about 4% to about 10%, about 4.5% to about 10%, and about 5% to about 10% of the total formulation by weight percentage. In a third set of ranges, the range of a chemical nucleating agent is one of the following ranges: about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent. However, a chemical blowing agent does not always act as a nucleating agent.

In another example, chemical blowing agents may be selected from the group consisting of azodicarbonamide; azodiisobutyro-nitrile; benzenesulfonhydrazide; 4,4-oxy-benzene sulfonylsemicarbazide; citric acid; citric-based material; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

Formulations used to produce insulative cellular non-aromatic polymeric materials may include one or more chemical blowing agents. The amount of a chemical blowing agent may be one of several different values or fall within one of several different ranges. It is within the scope of the present disclosure to select an amount of a chemical blowing agent to be one of the following values: about 0%, about 0.05%, about 0.1%, about 0.5%, about 0.75%, about 1%, about 1.5%, about 2%, about 3%, about 4%, and about 5%, of the total formulation of the polymeric layer by weight percentage. It is within the scope of the present disclosure for the amount of a chemical blowing agent in the formulation to fall within one of many different ranges. In a first set of ranges, the range of a chemical blowing agent is one of the following ranges: about 0.1% to about 5% (w/w), about 0.25% to about 5%, about 0.5% to about 5%, about 0.75% to about 5%, about 1% to about 5%, about 1.5% to about 5%, and about 2% to 5 about % of the total formulation of the polymeric layer by weight percentage. In a second set of ranges, the range of a chemical blowing agent is one of the following ranges: about 0.1% to about 2%, about 0.1% to about 3%, about 0.25% to about 2%, about 0.5% to about 2%, about 0.75% to about 2%, about 1% to about 2%, and about 1.5% to about 2% of the total formulation by weight percentage. In a third set of ranges, the range of a chemical blowing agent is one of the following ranges: about 0.1% to about 1%, about 0.25% to about 1%, about 0.5% to about 1%, and about 0.75% to about 1%, of the total formulation of the polymeric layer by weight percentage.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In an illustrative example, a physical blowing agent may be introduced at a rate of about 0.02 pounds per hour (lbs/h) to about 1.3 (lbs/h). In another illustrative example, the physical blowing agent may be introduced at a rate of about 0.03 (lbs/h) to about 1.25 (lbs/h). In another illustrative example, the physical blowing agent may be introduced at a rate of about 0.02 (lbs/h) to about 0.15 (lbs/h). In another illustrative example, the physical blowing agent may be introduced at a rate of about 0 (lbs/h) to about 0.15 (lbs/h). In another illustrative example, the physical blowing agent may be introduced at a rate of about 0.02 (lbs/h) to about 0.22 (lbs/h). In another illustrative example, the physical blowing agent may be introduced at a rate of about 0.02 (lbs/h) to about 0.25 (lbs/h). In still yet another illustrative example the physical blowing agent may be introduced at a rate of about 0.07 (lbs/h) to about 0.27 (lbs/h). In some embodiments, the physical blowing agent is used between about 0.01 lbs/h to about 0.2 lbs/h, about 0.01 lbs/h to about 0.17 lbs/h, about 0.01 lbs/h to about 0.15 lbs/h, about 0.01 lbs/h to about 0.1 lbs/h, about 0.05 lbs/h to about 0.2 lbs/h, about 0.05 lbs/h to about 0.17 lbs/h, about 0.05 lbs/h to about 0.15 lbs/h, about 0.05 lbs/h to about 0.1 lbs/h, about 0.1 lbs/h to about 0.2 lbs/h, about 0.1 lbs/h to about 0.17 lbs/h, or about 0.1 lbs/h to about 0.15 lbs/h.

In further embodiments, the physical blowing agent is measured in saturation percentage (%). In exemplary embodiments, physical blowing agent saturation can have a range that is about 0.1% to about 0.4%, about 0.1% to about 0.35%, about 0.1% to about 0.3%, about 0.1% to about 0.25%, 0.15% to about 0.4%, about 0.15% to about 0.35%, about 0.15% to about 0.3%, about 0.15% to about 0.25%, 0.2% to about 0.4%, about 0.2% to about 0.35%, about 0.2% to about 0.3%, or about 0.2% to about 0.25%.

In one aspect of the present disclosure, at least one slip agent may be incorporated into the formulation to aid in increasing production rates. Slip agent (also known as a process aid) is a term used to describe a general class of materials that is added to a formulation to provide surface lubrication to the polymer during and after conversion. Slip agents may also reduce or eliminate die drool. Representative examples of slip agents include amides of fats or fatty acids, such as, but not limited to, erucamide and oleamide. In one exemplary aspect, amides from oleyl (single unsaturated C-18) through erucyl (C-22 single unsaturated) may be used. Other representative examples of a slip agent include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

Formulations used to produce insulative cellular non-aromatic polymeric materials may include one or more slip agents. The amount of a slip agent may be one of several different values or fall within one of several different ranges. It is within the scope of the present disclosure to select an amount of a slip agent to be one of the following values: about 0%, about 0.1%, about 0.25%, about 0.5%, about 0.75%, about 1%, about 1.25%, about 1.5%, about 1.75%, about 2%, about 2.25%, about 2.5%, about 2.75%, about 3%, and about 4% of the total formulation of the polymeric layer by weight percentage. It is within the scope of the present disclosure for the amount of a slip agent in the formulation to fall within one of many different ranges. In a first set of ranges, the range of a slip agent is one of the following ranges: about 0% to about 4% (w/w), about 0.1% to about 4%, about 0.25% to about 4%, about 0.5% to about 4%, about 0.75% to about 4%, about 1% to about 4%, about 1.25% to about 4%, about 1.5% to about 4%, about 1.75% to about 4%, about 2% to about 4%, about 2.25% to about 4%, and about 2.5% to about 4% of the total formulation of the polymeric layer by weight percentage. In a second set of ranges, the range of a slip agent is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a slip agent is one of the following ranges: about 0.1% to about 2.5%, about 0.25% to about 2.25%, about 0.5% to about 2%, about 0.75% to about 1.75%, and 1 about % to about 1.5% of the total formulation by weight percentage. In an embodiment, the formulation lacks a slip agent.

In another aspect of the present disclosure, an impact modifier may be incorporated into a formulation to minimize fracturing of the insulative cellular non-aromatic polymeric material when subjected to an impact such as a drop test. One representative example of a suitable impact modifier is DOW® AFFINITY™ PL 1880G polyolefin plastomer.

Formulations used to produce insulative cellular non-aromatic polymeric materials may include one or more colorants. The colorants can be supplied in a masterbatch mixture and combined via blending with the formulation. In an example, Ampacet 112761 White Polyethylene Masterbatch is used as a colorant. The amount of a colorant may be one of several different values or fall within one of several different ranges. It is within the scope of the present disclosure to select an amount of a colorant to be one of the following values: about 0%, about 0.1%, about 0.25%, about 0.5%, about 0.75%, about 1%, about 2%, about 3%, about 4% about 5%, about 6%, and about 7% of the total formulation of the polymeric layer by weight percentage. It is within the scope of the present disclosure for the amount of a colorant in the formulation to fall within one of many different ranges. In a first set of ranges, the range of a colorant is one of the following ranges: about 0% to about 5% (w/w), about 0.1% to about 5%, about 0.25% to about 5%, about 0.5% to about 5%, about 0.75% to about 5%, about 1% to about 5%, about 1.25% to about 5%, about 1.5% to about 5%, about 1.75% to about 5%, about 2% to about 5%, about 2.25% to about 5%, about 2.5% to about 5%, about 3% to about 5%, and about 4% to about 5% of the total formulation of the polymeric layer by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a colorant is one of the following ranges: about 0.1% to about 3.5%, about 0.5% to about 3%, about 0.75% to about 2.5%, and about 1% to about 2% of the total formulation by weight percentage. In an embodiment, the formulation lacks a colorant.

A material-formulation process in accordance with the present disclosure uses a polyethylene-based formulation to produce a strip of insulative cellular non-aromatic polymeric material. Raw material according to the polyethylene-based material is gravity fed into the barrel of an extruder where it is heated to produce a molten material. A cell-forming agent is then introduced into the molten material prior to extrusion. As the molten materials exit the extruder, cells nucleate in the molten material, and the molten material expands and cools to form a sheet of insulative cellular non-aromatic polymeric material.

An insulative cellular non-aromatic polymeric material produced in accordance with the present disclosure can be formed to produce an insulative cup or an insulative container. In another illustrative example, the insulative cellular non-aromatic polymeric material produces a monolayer tube or monolayer parison that is blow molded to form an insulative container (e.g., bottle). In an embodiment, a monolayer foamed bottle further includes an extruded second layer (i.e., skin layer). In illustrative embodiments, a second layer can be linear low density polyethylene (LLDPE), low density polyethylene (LDPE), medium density polyethylene (MDPE), high density polyethylene (HDPE), polypropylene homopolymer, polypropylene impact copolymer, polypropylene random polymer, polystyrene, polyethylene terephthalate (PET), or polyvinyl chloride (PVC).

In an example, multi-layer container 14, 214, 314 includes a core layer 14B and at least one non-core layer. In an illustrative example, a core layer 14B is sandwiched between an inner polymeric layer 14A and an outer polymeric layer 14C. In an example, each layer (core and non-core layers) of multi-layer container 14, 214, 314 includes at least one HDPE base resin. In an embodiment, a non-core layer can include fiber. A suitable fiber can be a synthetic fiber that reinforces polyolefin formulations to provide, e.g., higher stiffness to the material and better feeding and handling during extrusion or blow molding process. A suitable fiber for a polymeric layer includes a synthetic, mineral based fiber, such as Hyperform® HPR-803i (Milliken & Co., Spartanburg, S.C.). Another suitable fiber blend contains about 15% Hyperform® HPR-803i (available from Milliken Chemical) and about 85% Braskem F020HC High Crystallinity Polypropylene (available from Braskem). In an embodiment, one or more non-core polymeric layers includes fiber. In an illustrative embodiment, a multi-layer container has fiber in an outer polymeric layer but an inner polymeric layer does not include fiber.

The amount of fiber may be one of several different values or fall within one of several different ranges. It is within the scope of the present disclosure to select an amount of fiber to be one of the following values: about 5%, about 10%, about 15%, about 20%, and about 25% of the layer by weight percentage. It is within the scope of the present disclosure for the amount of fiber in the layer to fall within one of many different ranges. In a first set of ranges, the range of fiber is one of the following ranges: about 0% to about 25% (w/w), about 5% to about 25%, about 10% to about 25%, about 15% to about 25%, and about 20% to about 25 of the total layer by weight percentage. In a second set of ranges, the range of fiber is one of the following ranges: about 0% to about 25%, about 0% to about 20%, about 0% to about 15%, about 0% to about 10%, and about 0% to about 5% of the total layer by weight percentage. In a third set of ranges, the range of a colorant is one of the following ranges: about 5% to about 20%, about 5% to about 15%, and about 5% to about 10%. In a fourth set of ranges, the range of fiber is one of the following ranges: about 10% to about 20%, and about 10% to about 15% of the total layer by weight percentage. In an embodiment, non-core layers lack fiber.

In an embodiment, one of the non-core layers can include a colorant. The colorants can be supplied in a masterbatch mixture and combined via blending with the formulation. In an example, Ampacet 112761 White Polyethylene Masterbatch is used as a colorant. The amount of a colorant may be one of several different values or fall within one of several different ranges. It is within the scope of the present disclosure to select an amount of a colorant to be one of the following values: about 0%, about 0.1%, about 0.25%, about 0.5%, about 0.75%, about 1%, about 2%, about 3%, about 4% about 5%, about 6%, and about 7% of the total formulation of the polymeric layer by weight percentage.

It is within the scope of the present disclosure for the amount of a colorant in the formulation to fall within one of many different ranges. In a first set of ranges, the range of a colorant is one of the following ranges: about 0% to about 7% (w/w), about 0.1% to about 7%, about 0.25% to about 7%, about 0.5% to about 7%, about 0.75% to about 7%, about 1% to about 7%, about 1.25% to about 7%, about 1.5% to about 7%, about 1.5% to about 6%, about 1.5% to about 5%, about 1.75% to about 5%, about 2% to about 5%, about 2.25% to about 5%, about 2.5% to about 5%, about 3% to about 5%, and about 4% to about 5% of the total formulation of the polymeric layer by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a colorant is one of the following ranges: about 0.1% to about 3.5%, about 0.5% to about 3%, about 0.75% to about 2.5%, and about 1% to about 2% of the total formulation by weight percentage. In an embodiment, the formulation lacks a colorant.

In an illustrative example, multi-layer container 14, 214, 314 is a bottle having a) a core layer comprising HDPE, a chemical blowing agent, and talc; b) an outer polymeric layer comprising HDPE, a colorant, and fiber; and c) an inner polymeric layer comprising HDPE and fiber. In one example, the density of multi-layer container 14 is less than about 0.75 g/cm$^3$. In one example, the density of multi-layer container 14 is less than about 0.7 g/cm$^3$. In one example, the density of multi-layer container 14 is less than about 0.75 g/cm$^3$. In one example, the density of multi-layer container 14 is less than about 0.7 g/cm$^3$. In one example, the density of multi-layer container 14 is less than about 0.65 g/cm$^3$. In one example, the density of multi-layer container 14 is less than about 0.6 g/cm$^3$. In another example, the density of multi-layer container 14 is less than about 0.55 g/cm$^3$. In another example, the density of multi-layer container 14 is less than about 0.5 g/cm$^3$. In another example, the density of multi-layer container 14 is less than about 0.45 g/cm$^3$. In another example, the density of multi-layer container 14 is less than about 0.4 g/cm$^3$. In one example, the density of multi-layer container 14 is one of the following ranges: about 0.4 g/cm$^3$ to about 0.8 g/cm$^3$, about 0.4 g/cm$^3$ to about 0.7 g/cm$^3$, about 0.4 g/cm$^3$ to about 0.55 g/cm$^3$, about 0.4 g/cm$^3$ to about 0.5 g/cm$^3$, or about 0.4 g/cm$^3$ to about 0.45 g/cm$^3$.

In an embodiment, the insulative cellular non-aromatic polymeric material is located between and coupled to an inner polymeric layer and an outer polymeric layer to produce a multi-layer tube 12. The density of the multi-layer tube 12 may be one of several different values or fall within one several different ranges. It is within the scope of the present disclosure for the density of the multi-layer tube 12 to fall within one of many different ranges. In a first set of ranges, the density is one of the following ranges: about 0.5 g/cm$^3$ to about 0.92 g/cm$^3$, about 0.6 g/cm$^3$ to about 0.92 g/cm$^3$, about 0.65 g/cm$^3$ to about 0.92 g/cm$^3$, about 0.7 g/cm$^3$ to about 0.92 g/cm$^3$, about 0.75 g/cm$^3$ to about 0.92 g/cm$^3$, about 0.8 g/cm$^3$ to about 0.92 g/cm$^3$, about 0.85 g/cm$^3$ to about 0.92 g/cm$^3$, and about 0.9 g/cm$^3$ to about 0.92 g/cm$^3$. In a second set of ranges, the density is one of the following ranges: about 0.5 g/cm$^3$ to about 0.9 g/cm$^3$, about 0.6 g/cm$^3$ to about 0.9 g/cm$^3$, about 0.65 g/cm$^3$ to about 0.9 g/cm$^3$, about 0.7 g/cm$^3$ to about 0.9 g/cm$^3$, about 0.75 g/cm$^3$ to about 0.9 g/cm$^3$, about 0.8 g/cm$^3$ to about 0.9 g/cm$^3$, and about 0.85 g/cm$^3$ to about 0.9 g/cm$^3$. In a third set of ranges, the density is one of the following ranges: about 0.6 g/cm$^3$ to about 0.85 g/cm$^3$, about 0.65 g/cm$^3$ to about 0.8 g/cm$^3$, and about 0.7 g/cm$^3$ to about 0.75 g/cm$^3$.

Figure 4:
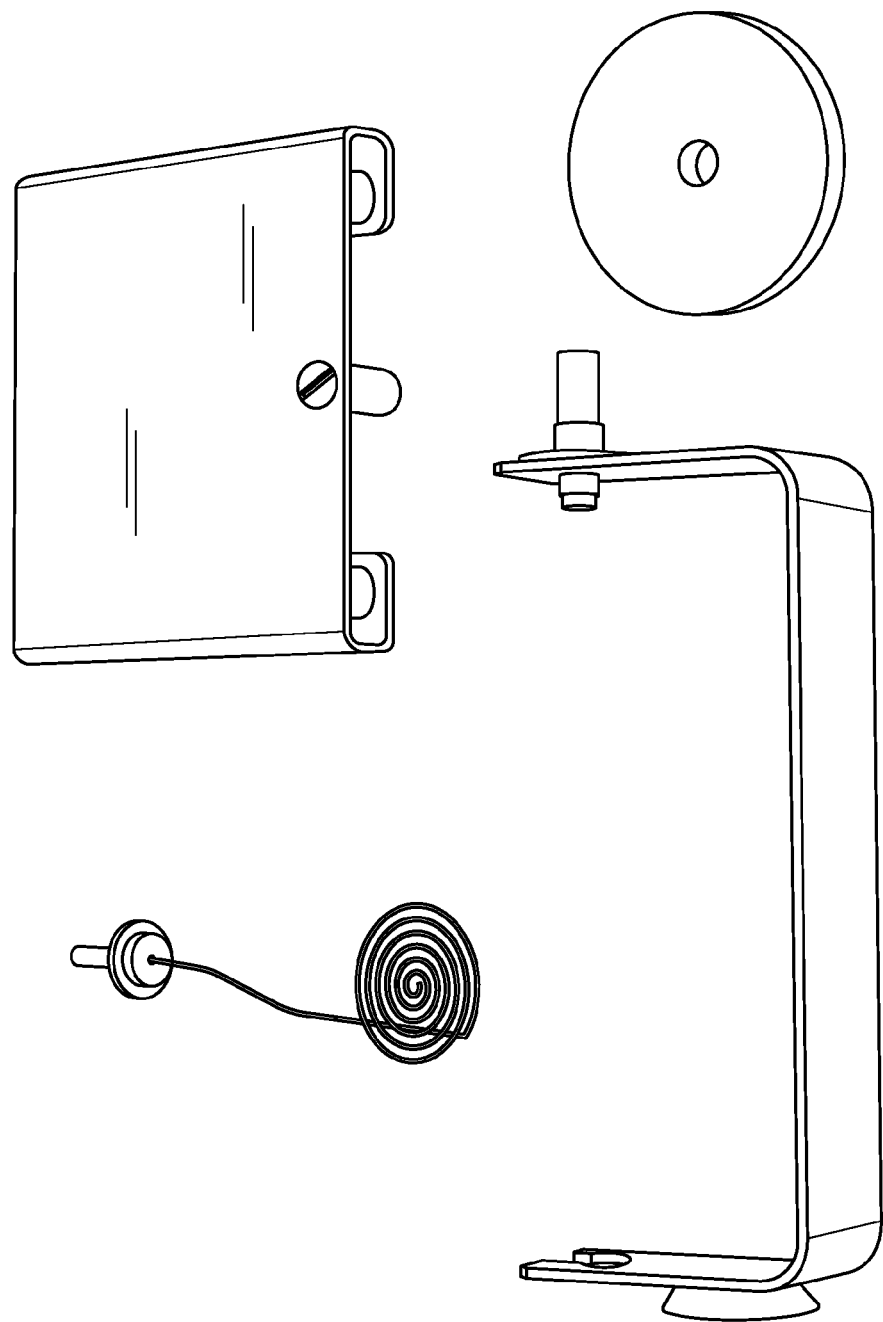
FIG. 4 is a perspective view of an unassembled density determination apparatus showing the components (clockwise starting in the upper left) gem holder, platform, suspension bracket, and suspension spacer.
Figure 5:
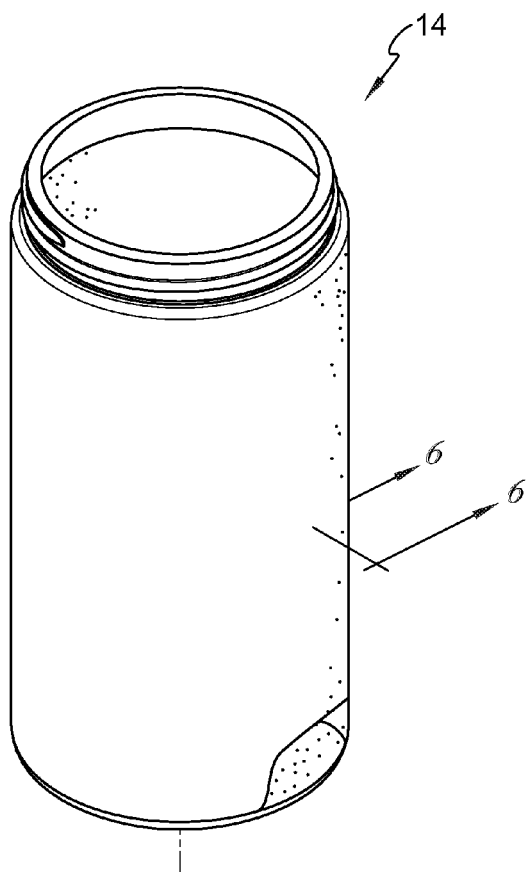
FIG. 5 is a perspective view of the multi-layer container formed from the insulative cellular non-aromatic polymeric material using a container-molding process.

In an embodiment, the insulative cellular non-aromatic polymeric material is located between and coupled to an inner polymeric layer 12A and an outer polymeric 12C layer to produce a multi-layer parison. The density of the multi-layer parison 12 may be one of several different values or fall within one several different ranges. It is within the scope of the present disclosure for the density of the multi-layer parison 10 to fall within one of many different ranges. In a first set of ranges, the density is one of the following ranges: about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the density of a multi-layer parison is one of the following ranges: about 0.4 g/cm$^3$ to about 0.75 g/cm$^3$, about 0.4 g/cm$^3$ to about 0.7 g/cm$^3$, about 0.4 g/cm$^3$ to about 0.65 g/cm$^3$, about 0.4 g/cm$^3$ to about 0.6 g/cm$^3$, about 0.4 g/cm$^3$ to about 0.55 g/cm$^3$, about 0.4 g/cm$^3$ to about 0.5 g/cm$^3$, and about 0.4 g/cm$^3$ to about 0.45 g/cm$^3$. In a third set of ranges, the density of a multi-layer parison is one of the following ranges: about 0.45 g/cm$^3$ to about 0.7 g/cm$^3$, about 0.5 g/cm$^3$ to about 0.65 g/cm$^3$, and about 0.55 g/cm$^3$ to about 0.6 g/cm$^3$. Density was determined according to the density test procedure outlined in Example 14 using the apparatus in FIG. 4.

In an embodiment, the density of multi-layer tube 12 may be one of several different values or fall within one of several different ranges. It is within the scope of the present disclosure to select a density and be one of the following values: about 0.1 g/cm$^3$, about 0.15 g/cm$^3$, about 0.2 g/cm$^3$, about 0.25 g/cm$^3$, about 0.3 g/cm$^3$, about 0.35 g/cm$^3$, about 0.4 g/cm$^3$ about 0.45 g/cm$^3$, about 0.5 g/cm$^3$, about 0.55 g/cm$^3$, about 0.6 g/cm$^3$, about 0.65 g/cm$^3$, about 0.7 g/cm$^3$, about 0.75 g/cm$^3$, about 0.785 g/cm$^3$, and about 0.8 g/cm$^3$. It is within the scope of the present disclosure for the density of the formulation to fall within one of many different ranges. In a first set of ranges, the range of density is one of the following ranges: about 0.1 g/cm$^3$ to about 0.8 g/cm$^3$, about 0.15 g/cm$^3$ to about 0.8 g/cm$^3$, about 0.2 g/cm$^3$ to about 0.8 g/cm$^3$, about 0.25 g/cm$^3$ to about 0.8 g/cm$^3$, about 0.3 g/cm$^3$ to about 0.8 g/cm$^3$, about 0.35 g/cm$^3$ to about 0.8 g/cm$^3$, about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the range of density is one of the following ranges: about 0.1 g/cm$^3$ to about 0.75 g/cm$^3$, about 0.1 g/cm$^3$ to about 0.7 g/cm$^3$, about 0.1 g/cm$^3$ to about 0.65 g/cm$^3$, about 0.1 g/cm$^3$ to about 0.6 g/cm$^3$, about 0.1 g/cm$^3$ to about 0.55 g/cm$^3$, about 0.1 g/cm$^3$ to about 0.5 g/cm$^3$, about 0.1 g/cm$^3$ to about 0.45 g/cm$^3$, about 0.1 g/cm$^3$ to about 0.4 g/cm$^3$, about 0.1 g/cm$^3$ to about 0.35 g/cm$^3$, about 0.1 g/cm$^3$ to about 0.3 g/cm$^3$, about 0.1 g/cm$^3$ to about 0.25 g/cm$^3$, about 0.1 g/cm$^3$ to about 0.2 g/cm$^3$, and about 0.1 g/cm$^3$ to about 0.15 g/cm$^3$. In a third set of ranges, the range of density is one of the following ranges: about 0.3 g/cm$^3$ to about 0.8 g/cm$^3$, about 0.35 g/cm$^3$ to about 0.8 g/cm$^3$, about 0.35 g/cm$^3$ to about 0.75 g/cm$^3$, about 0.4 g/cm$^3$ to about 0.75 g/cm$^3$, about 0.4 g/cm$^3$ to about 0.7 g/cm$^3$, about 0.4 g/cm$^3$ to about 0.65 g/cm$^3$, and about 0.4 g/cm$^3$ to about 0.6 g/cm$^3$. Each of these values and ranges is embodied in the Examples. Density was determined according to the density test procedure outlined in Example 14 using the apparatus in FIG. 4.

In an embodiment, the density of the insulative cellular non-aromatic polymeric material may be one of several different values or fall within one of several different ranges. It is within the scope of the present disclosure to select a density and be one of the following values: about 0.1 g/cm$^3$, about 0.15 g/cm$^3$, about 0.2 g/cm$^3$, about 0.25 g/cm$^3$, about 0.3 g/cm$^3$, about 0.35 g/cm$^3$, about 0.4 g/cm$^3$ about 0.45 g/cm$^3$, about 0.5 g/cm$^3$, about 0.55 g/cm$^3$, about 0.6 g/cm$^3$, about 0.65 g/cm$^3$, about 0.7 g/cm$^3$, about 0.75 g/cm$^3$, about 0.785 g/cm$^3$, and about 0.8 g/cm$^3$. It is within the scope of the present disclosure for the density of the insulative cellular non-aromatic polymeric material to fall within one of many different ranges. In a first set of ranges, the range of density is one of the following ranges: about 0.1 g/cm$^3$ to about 0.8 g/cm$^3$, about 0.15 g/cm$^3$ to about 0.8 g/cm$^3$, about 0.2 g/cm$^3$ to about 0.8 g/cm$^3$, about 0.25 g/cm$^3$ to about 0.8 g/cm$^3$, about 0.3 g/cm$^3$ to about 0.8 g/cm$^3$, about 0.35 g/cm$^3$ to about 0.8 g/cm$^3$, about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the range of density is one of the following ranges: about 0.1 g/cm$^3$ to about 0.75 g/cm$^3$, about 0.1 g/cm$^3$ to about 0.7 g/cm$^3$, about 0.1 g/cm$^3$ to about 0.65 g/cm$^3$, about 0.1 g/cm$^3$ to about 0.6 g/cm$^3$, about 0.1 g/cm$^3$ to about 0.55 g/cm$^3$, about 0.1 g/cm$^3$ to about 0.5 g/cm$^3$, about 0.1 g/cm$^3$ to about 0.45 g/cm$^3$, about 0.1 g/cm$^3$ to about 0.4 g/cm$^3$, about 0.1 g/cm$^3$ to about 0.35 g/cm$^3$, about 0.1 g/cm$^3$ to about 0.3 g/cm$^3$, about 0.1 g/cm$^3$ to about 0.25 g/cm$^3$, about 0.1 g/cm$^3$ to about 0.2 g/cm$^3$, and about 0.1 g/cm$^3$ to about 0.15 g/cm$^3$. In a third set of ranges, the range of density is one of the following ranges: about 0.1 g/cm$^3$ to about 0.8 g/cm$^3$, about 0.15 g/cm$^3$ to about 0.75 g/cm$^3$, about 0.2 g/cm$^3$ to about 0.6 g/cm$^3$, about 0.2 g/cm$^3$ to about 0.5 g/cm$^3$, about 0.2 g/cm$^3$ to about 0.45 g/cm$^3$, about 0.25 g/cm$^3$ to about 0.45 g/cm$^3$, and about 0.25 g/cm$^3$ to about 0.4 g/cm$^3$. Each of these values and ranges is embodied in the Examples. Density of the insulative cellular non-aromatic polymeric material may be determined by any suitable method. One example of determining density includes measuring a density of the multi-layer tube or multi-layer container, determining relative thicknesses of each layer, and calculating the density of the insulative cellular non-aromatic polymeric material using the relative thicknesses of the layers, the known density of the other layers, and the known density of the multi-layer tube or container.

In an embodiment, the insulative cellular non-aromatic polymeric material is located between and coupled to an inner polymeric layer and an outer polymeric layer to produce a multi-layer parison. The outer layer thickness of the multi-layer parison may be one of several different values or fall within one several different ranges. It is within the scope of the present disclosure for the thickness of the outer layer of the multi-layer parison to fall within one of many different ranges. In a first set of ranges, the thickness of the outer layer is one of the following ranges: about 5 mils to about 26 mils, about 6 mils to about 24 mils, about 8 mils to about 24 mils, and about 10 mils to about 24 mils. In a second set of ranges, the thickness of the outer layer of a multi-layer parison is one of the following ranges: about 5 mils to about 26 mils, about 6 mils to about 24 mils, about 8 mils to about 24 mils, and about 10 mils to about 24 mils. In another set of ranges, the outer layer thickness can be a percentage of the overall thickness of the multi-layer parison. In a set of ranges, the percentage thickness of the outer layer can be about 4% to about 9%, about 5% to about 9%, about 5% to about 8%, about 5.5% to about 8%, and about 5.5% to about 7% of the overall thickness of the multi-layer parison.

In an embodiment, the insulative cellular non-aromatic polymeric material is located between and coupled to an inner polymeric layer and an outer polymeric layer to produce a multi-layer parison. The core layer thickness of the multi-layer parison may be one of several different values or fall within one several different ranges. It is within the scope of the present disclosure for the thickness of the core layer of the multi-layer parison to fall within one of many different ranges. In a first set of ranges, the thickness is one of the following ranges: about 14 mils to 130 mils, about 20 mils to about 130 mils, about 40 mils to about 130 mils, and about 50 mils to about 130 mils. In a second set of ranges, the thickness of the core layer is one of the following ranges: about 60 mils to about 130 mils, about 70 mils to about 130 mils, about 80 mils to about 130 mils, about 90 mils to about 130 mils, and about 100 mils to about 130 mils, and about 6.5 mils to about 8 mils. In another set of ranges, the core layer thickness can be a percentage of the overall thickness of the multi-layer parison. In a first set of ranges, the percentage thickness of the outer layer can be about 4% to about 9%, about 5% to about 9%, about 5% to about 8%, about 5.5% to about 8%, and about 5.5% to about 7% of the overall thickness of the multi-layer parison.

In an embodiment, the insulative cellular non-aromatic polymeric material is located between and coupled to an inner polymeric layer and an outer polymeric layer to produce a multi-layer parison. The inner layer thickness of the multi-layer parison may be one of several different values or fall within one several different ranges. It is within the scope of the present disclosure for the thickness of the inner layer of the multi-layer parison to fall within one of many different ranges. In a first set of ranges, the thickness is one of the following ranges: about 3.0 mils to about 15.5 mils.

In an embodiment, a throughput system includes a multi-parison drop. For example, an extrusion line starts as a single line and then splits into 2, 3, 4, 5, or more lines for multiple parison drops. In an embodiment, the RPMs for the extrusion stream start at a particular level (e.g., 48 RPM) and splits evenly into 2 (e.g., 24 RPM each), 3 (e.g., 16 RPM each), 4 (12 RPM each), or more multi-parison drops splitting the RPMs. A more efficient output can be achieved by splitting the extrusion stream into multiple parison drop streams. Thereby, an embodiment includes a system comprising an extrusion stream that splits into multiple parison streams. In an embodiment, the system provides multiple foamed parison drops. Such a system that splits the extrusion line into multiple parison drops can produce foamed bottle. In an embodiment, the foamed bottles have densities as described herein.

Containers (e.g., bottles) can be subjected to a drop test, which is a test to determine a container's ability to withstand free-fall impact forces. Containers that do not pass the drop test are not suitable for commercial applications. In an illustrative embodiment, the insulative cellular non-aromatic polymeric material is coupled and located between two polymeric layers to form a multi-layer parison. The multi-layer parison is then formed, for example, via blow molding into container 14, 214, 314. The container is then filled with water and closed off with, for example, a lid. The sample container is then held at about 73 degrees Fahrenheit (22.8 degrees Celsius) and about 50% relative humidity. The filled, capped containers are then subjected to the following drop test procedure: (a) the filled, capped container is located at about five feet above a hard surface such as concrete or tile; (b) the filled, capped container is then oriented such that a bottom of the filled, capped container is arranged to lie in substantially parallel relation to the hard surface; (c) each of ten capped, filled containers are dropped; (d) upon impact, each filled, capped container is examined for any break or shattering of the wall that causes water to leak out of the bottle; and (e) the total number of bottles showing any sign of leakage after the drop test are counted as failures.

A method of producing a container or parison as described herein includes extruding or blow-molding any of the formulations described herein. An illustrative embodiment of a blow molded container 14 is FIG. 5. Another illustrative embodiment of a blow molded is FIG. 7. Another illustrative embodiment of a blow molded container 314 is FIG. 8.

In an illustrative embodiment, a formulation for producing an insulative cellular non-aromatic polymeric material includes about 98% HDPE, about 0.5% chemical blowing agent (CBA), and about 1.5% nucleating agent (e.g., talc). The formulation can be used to produce a material that is a) a monolayer forming a container or parison or b) the core layer in a multi-layer container or parison. In an illustrative multi-layer embodiment, a core layer of about 98% HDPE, about 0.5% CBA, and about 1.5% nucleating agent can be sandwiched between at least one inner polymeric layer and at least one outer polymeric layer. An illustrative outer polymeric layer includes i) about 80% HDPE, ii) 5 about % colorant, and iii) about 15% fiber. An illustrative inner polymeric layer includes about 85% HDPE and about 15% fiber.

In an illustrative embodiment, a formulation for producing an insulative cellular non-aromatic polymeric material includes about 98.75% HDPE, about 0.75% chemical blowing agent (CBA), and about 0.2% nucleating agent (e.g., talc).

In an illustrative embodiment, a formulation for producing an insulative cellular non-aromatic polymeric material includes about 98% HDPE and about 2.0% chemical blowing agent (CBA).

In an illustrative embodiment, a formulation for producing an insulative cellular non-aromatic polymeric material includes about 96.5% HDPE, about 0.5% chemical blowing agent (CBA), about 2% slip agent, and about 1% colorant.

In an illustrative embodiment, a formulation for producing an insulative cellular non-aromatic polymeric material includes about 95% HDPE, about 1.5% chemical blowing agent (CBA), about 2% slip agent, about 0.5% nucleating agent (e.g., talc) and about 1% colorant, wherein the about 95% is about a 50%/50% blend of two separate HDPE resins. Thus, each HDPE resin is about 47.5% of the total formulation of the polymeric layer by weight percentage.

In an illustrative embodiment, a formulation for producing an insulative cellular non-aromatic polymeric material includes about 82.54% HDPE, about 62% chemical blowing agent (CBA), about 2.49% slip agent, about 11.16% nucleating agent (e.g., talc) and 3.19% colorant.

Figure 8:
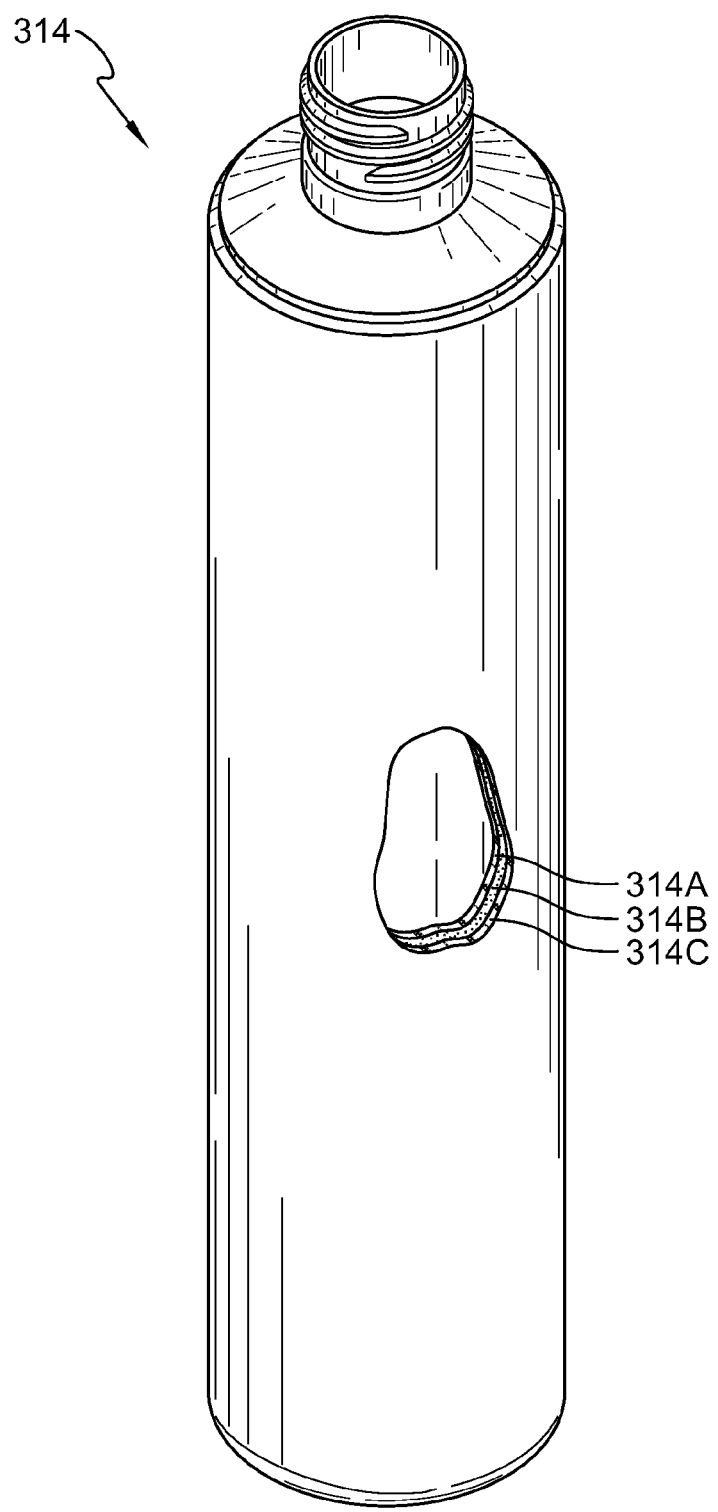
FIG. 8 is a perspective view of another embodiment of a multi-layer container made insulative cellular non-aromatic material in accordance with the present disclosure with portions broken away to reveal that the multi-layer container includes an inner layer, a core layer, and an outer layer.

In illustrative embodiments the formulation may be used to form a multi-layer container 314, as shown in FIG. 8. Multi-layer container 314 includes a floor 388, a cylindrical container wall 390, and cylindrical neck 392 as shown in FIG. 8. Multi-layer container 314 is formed of an outer layer 390A, an inner layer 390C, and a core layer 390B located therebetween that has a thickness 390D.

The Following Numbered Paragraphs Define Particular Embodiments of the Insulative Cellular Non-Aromatic Polymeric Material Formulation of the Invention:

1) about 80-about 99.9 wt % of at least one HDPE polymeric resin;
about 0.1-about 12 wt % of at least one nucleating agent selected from physical nucleating agents and chemical nucleating agents; and
optionally, the balance of the formulation comprising one or more additives selected from slip agents, colorants and impact modifiers.

2) about 80-about 99.9 wt % of at least one HDPE polymeric resin;
about 0.1-about 12 wt % of at least one nucleating agent selected from physical nucleating agents and chemical nucleating agents;
about 0.5-about 3 wt % of at least one slip agent; and
optionally the balance of the formulation comprising one or more additives selected from colorants and impact modifiers.

3) about 84-about 99.9 wt % of at least one HDPE polymeric resin;
about 0.1-about 3 wt % of at least one nucleating agent selected from physical nucleating agents and chemical nucleating agents; and
optionally the balance of the formulation comprising one or more additives selected from slip agents, colorants and impact modifiers.

4) about 84-99.9 wt % of at least one HDPE polymeric resin;
about 0.1-about 3 wt % of at least one nucleating agent selected from physical nucleating agents and chemical nucleating agents;
about 0.5-about 3 wt % of at least one slip agent; and
optionally the balance of the formulation comprising one or more additives selected from colorants and impact modifiers.

5) about 85-about 99.9 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.

6) about 85-about 99.9 wt % of at least one HDPE polymeric resin;
about 0.1-about 2.5 wt % of at least one nucleating agent selected from physical nucleating agents and chemical nucleating agents;
about 0.5-about 3 wt % of at least one slip agent; and
optionally the balance of the formulation comprising one or more additives selected from colorants and impact modifiers.

7) about 85-about 99.7 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.

8) about 85-about 99.7 wt % of at least one HDPE polymeric resin;
about 0.1-about 2.5 wt % of at least one nucleating agent selected from physical nucleating agents and chemical nucleating agents;
about 0.5-about 2.5 wt % of at least one slip agent; and
optionally the balance of the formulation comprising one or more additives selected from colorants and impact modifiers.

9) about 87-about 99.7 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.

10) about 87-about 99.7 wt % of at least one HDPE polymeric resin;
about 0.1-about 2.5 wt % of at least one nucleating agent selected from physical nucleating agents and chemical nucleating agents;
about 0.8-about 2.5 wt % of at least one slip agent; and
optionally the balance of the formulation comprising one or more additives selected from colorants and impact modifiers.

11) about 90-about 99.7 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.

12) about 90-about 99.7 wt % of at least one HDPE polymeric resin;
about 0.1-about 2.5 wt % of at least one nucleating agent selected from physical nucleating agents and chemical nucleating agents;
about 0.8-about 2.5 wt % of at least one slip agent; and
optionally the balance of the formulation comprising one or more additives selected from colorants and impact modifiers.

13) about 90-about 99.7 wt % of at least one HDPE polymeric resin;
about 0.1-about 2.2 wt % of at least one nucleating agent selected from physical nucleating agents and chemical nucleating agents; and
optionally the balance of the formulation comprising one or more additives selected from slip agents, colorants and impact modifiers.

14) about 90-about 99.7 wt % of at least one HDPE polymeric resin;
about 0.1-about 2.2 wt % of at least one nucleating agent selected from physical nucleating agents and chemical nucleating agents;
about 0.8-about 2.5 wt % of at least one slip agent; and
optionally the balance of the formulation comprising one or more additives selected from colorants and impact modifiers.

15) about 92-about 99.7 wt % of at least one HDPE polymeric resin;
about 0.1-about 2.2 wt % of at least one nucleating agent selected from physical nucleating agents and chemical nucleating agents; and
optionally the balance of the formulation comprising one or more additives selected from slip agents, colorants and impact modifiers.

16) about 92-about 99.7 wt % of at least one HDPE polymeric resin;
about 0.1-about 2.2 wt % of at least one nucleating agent selected from physical nucleating agents and chemical nucleating agents;
about 0.8-about 2.5 wt % of at least one slip agent; and
optionally the balance of the formulation comprising one or more additives selected from colorants and impact modifiers.
17) about 95-about 99.7 wt % of at least one HDPE polymeric resin;
about 0.1-about 2.0 wt % of at least one nucleating agent selected from physical nucleating agents and chemical nucleating agents; and
optionally the balance of the formulation comprising one or more additives selected from slip agents, colorants and impact modifiers.
18) about 95-about 99.7 wt % of at least one HDPE polymeric resin;
about 0.1-about 2.0 wt % of at least one nucleating agent selected from physical nucleating agents and chemical nucleating agents;
about 0.8-about 2.5 wt % of at least one slip agent; and
optionally the balance of the formulation comprising one or more additives selected from colorants and impact modifiers.
19) about 95-about 99.5 wt % of at least one HDPE polymeric resin;
0.1-2.0 wt % of at least one nucleating agent selected from physical nucleating agents and chemical nucleating agents; and
optionally the balance of the formulation comprising one or more additives selected from slip agents, colorants and impact modifiers.
20) about 95-about 99.5 wt % of at least one HDPE polymeric resin;
about 0.1-about 2.0 wt % of at least one nucleating agent selected from physical nucleating agents and chemical nucleating agents;
about 0.8-about 2.5 wt % of at least one slip agent; and
optionally the balance of the formulation comprising one or more additives selected from colorants and impact modifiers.

In any of the numbered paragraphs (1)-(20) above, the one or more HDPE polymeric resin may be selected from HDPE homopolymer or HDPE copolymer. Suitably, the one or more HDPE polymeric resin is selected from DOW® DOWLEX™ IP 41 HDPE (available from The Dow Chemical Company) that has been electron-beam modified to provide long-chain branching and a melt index of about 0.25 g/10 min, EQUISTAR® ALATHON® H5520 HDPE copolymer (available from Lyondell Chemical Company) that has been electron-beam modified to have long-chain branching and a melt index of about 0.25 g/10 min, FORMOLENE® HB5502F HDPE hexene copolymer (available from Formosa Plastics Corporation), and Marlex® HHM 5502BN HDPE hexene copolymer. In one embodiment, the one or more HDPE polymeric resin is DOW® DOWLEX™ IP 41 HDPE. In another embodiment, the one or more HDPE polymeric resin is DOW® DOWLEX™ IP 41 HDPE and FORMOLENE® HB5502F HDPE hexene copolymer. In another embodiment, the one or more HDPE polymeric resin is FORMOLENE® HB5502F HDPE hexene copolymer and EQUISTAR® ALATHON® H5520 HDPE copolymer. In one embodiment, the one or more HDPE polymeric resin is DOW® DOWLEX™ IP 41 HDPE and Marlex® HHM 5502BN HDPE hexene copolymer.

In any of the numbered paragraphs (1)-(20) above, the at least one nucleating agent may be a physical nucleating agent selected from talc, $CaCO_3$ and/or mica, and/or a chemical nucleating agent selected from citric acid or a citric acid-based material (e.g. HYDROCEROL™ CF-40E, available from Clariant Corporation). In one embodiment, the at least one nucleating agent is a mixture of talc and HYDROCEROL™ CF-40E. In another embodiment, the at least one nucleating agent is talc. In another embodiment, the at least one nucleating agent is HYDROCEROL™ CF-40E.

In any of the numbered paragraphs (1)-(20) above, the at least one slip agent may be selected from amides, fluoroelastomers, amides of fats or fatty acids, such as erucamide and oleamide, and amides from oleyl (single unsaturated C-18) through erucyl (C-22 single unsaturated). In one embodiment, the at least one slip agent is Ampacet 102823 Process Aid PE MB LLDPE.

In any of the numbered paragraphs (1)-(20) above, the colorant(s) may be selected from any suitable colorant. In one embodiment, the colorant is COLORTECH® 11933-19 Titanium Oxide Colorant.

In any of the numbered paragraphs (1)-(20) above, the impact modifier(s) may be selected from any suitable impact modifier. In one embodiment, the impact modifier is DOW® AFFINITY™ PL 1880G polyolefin plastomer.

The following numbered paragraphs define particular embodiments of the insulative cellular non-aromatic polymeric material formulation of the invention:

21) about 80-about 99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;
about 0.1-about 7 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.
22) about 80-about 99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;
about 0.1-about 7 wt % of at least one nucleating agent selected from talc, $CaCO_3$, mica, and/or a chemical nucleating agent selected from citric acid or a citric acid-based material (e.g. HYDROCEROL™ CF-40E);
about 0.5-about 3 wt % of at least one slip agent; and
optionally the balance of the formulation comprising one or more additives selected from colorants and impact modifiers.
23) about 84-about 99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;
about 0.1-about 3 wt % of at least one nucleating agent selected from talc, $CaCO_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

24) about 84-about 99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 3 wt % of at least one nucleating agent selected from talc, $CaCO_3$, mica, and/or a chemical nucleating agent selected from citric acid or a citric acid-based material (e.g. HYDROCEROL™ CF-40E);
about 0.5-about 3 wt % of at least one slip agent; and
optionally the balance of the formulation comprising one or more additives selected from colorants and impact modifiers.

25) about 85-about 99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

26) about 85-about 99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E);
about 0.5-about 3 wt % of at least one slip agent; and
optionally the balance of the formulation comprising one or more additives selected from colorants and impact modifiers.

27) about 85-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

28) about 85-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E);
about 0.5-about 2.5 wt % of at least one slip agent; and
optionally the balance of the formulation comprising one or more additives selected from colorants and impact modifiers.

29) about 87-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

30) about 87-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E);
about 0.8-about 2.5 wt % of at least one slip agent; and
optionally the balance of the formulation comprising one or more additives selected from colorants and impact modifiers.

31) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

32) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
about 0.1-about 2.5 wt % of at least one nucleating agent selected from talc, $CaCO_3$, mica, and/or a chemical nucleating agent selected from citric acid or a citric acid-based material (e.g. HYDROCEROL™ CF-40E);
about 0.8-about 2.5 wt % of at least one slip agent; and
optionally the balance of the formulation comprising one or more additives selected from colorants and impact modifiers.

33) about 90-about 99.7 wt % of at least one HDPE polymeric resin selected from DOW® DOWLEX™ IP 41 HDPE, EQUISTAR® ALATHON® H5520 copolymer, and FORMOLENE® HB5502F HDPE hexene copolymer, and Marlex® HHM 5502BN HDPE hexene copolymer;

about 0.1-about 2.2 wt % of at least one nucleating agent selected from talc, CaCO$_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

34) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, CaCO$_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

35) about 92-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, CaCO$_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

36) about 92-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, CaCO$_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

37) about 95-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, CaCO$_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

38) about 95-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, CaCO$_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

39) about 95-about 99.5 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, CaCO$_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

40) about 95-about 99.5 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, CaCO$_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

In any of the numbered paragraphs (21)-(40) above, the at least one slip agent may be selected from amides, fluoroelastomers, amides of fats or fatty acids, such as erucamide and oleamide, and amides from oleyl (single unsaturated C-18) through erucyl (C-22 single unsaturated). In one embodiment, the at least one slip agent is Ampacet 102823 Process Aid PE MB LLDPE.

In any of the numbered paragraphs (21)-(40) above, the colorant(s) may be selected from any suitable colorant. In one embodiment, the colorant is COLORTECH® 11933-19 Titanium Oxide Colorant.

In any of the numbered paragraphs (21)-(40) above, the impact modifier(s) may be selected from any suitable impact modifier. In one embodiment, the impact modifier is DOW® AFFINITY™ PL 1880G polyolefin plastomer.

One or more additional components and additives optionally may be incorporated, such as, but not limited to, colorants (such as, but not limited to, titanium dioxide), and compound regrind.

EXAMPLES

Example 1

Formulation and Extrusion

DOW® DOWLEX™ IP 41 HDPE was used as the polyethylene base resin. The polyethylene base resin was blended with HYDROCEROL® CF 40E as a nucleating agent and N₂ as a blowing agent Ampacet 102823 Process Aid PE MB LLDPE was added as a slip agent and COLORTECH® 11933-19 was added as a colorant. The percentages were about:

| | |
|---|---|
| 96.5% | DOW ® DOWLEX ™ IP 41 HDPE |
| 0.5% | HYDROCEROL ® CF 40E |
| 2.0% | Ampacet 102823 Process Aid PE MB LLDPE |
| 1.0% | COLORTECH ® 11933-19 Titanium Oxide Colorant |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr N₂ |

The N₂ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which was then blow molded to form the insulative container.

Test Results

The insulative cellular non-aromatic polymeric material was mated to inner and outer polymeric layers to form a multi-layer parison having a density of about 0.480 grams per cubic centimeter. The multi-layer parison was then blow molded to establish an insulative container having a density of about 0.695 grams per cubic centimeter.

Example 2

Formulation and Extrusion

DOW® DOWLEX™ IP 41 HDPE was used as the polyethylene base resin. The polyethylene base resin was blended with Heritage Plastics HT6000 LLDPE talc as a nucleating agent, HYDROCEROL® CF 40E as another nucleating agent, and N₂ as a blowing agent. Ampacet 102823 Process Aid PE MB LLDPE was added as a slip agent and COLORTECH® 11933-19 was added as a colorant. The percentages were about:

| | |
|---|---|
| 87.4% | DOW ® DOWLEX ™ IP 41 HDPE |
| 5.33% | Heritage Plastics HT6000 LLDPE Based Talc Concentrate |
| 3.88% | COLORTECH ® 11933-19 Titanium Oxide Colorant |
| 1.45% | HYDROCEROL ® CF 40E |
| 1.94% | Ampacet 102823 Process Aid PE MB LLDPE |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr N₂ |

The N₂ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish an insulative container. The insulative container has a density of about 0.770 grams per cubic centimeter.

Example 3

Formulation and Extrusion

DOW® DOWLEX™ IP 41 HDPE was used as the polyethylene base resin. The polyethylene base resin was blended with Heritage Plastics HT6000 LLDPE talc as a nucleating agent, HYDROCEROL® CF 40E as another nucleating agent, and N₂ as a blowing agent. Ampacet 102823 Process Aid PE MB LLDPE was added as a slip agent and COLORTECH® 11933-19 was added as a colorant. The percentages were about:

| | |
|---|---|
| 87.4% | DOW ® DOWLEX ™ IP 41 HDPE |
| 6.3% | Heritage Plastics HT6000 LLDPE Based Talc Concentrate |
| 3.19% | COLORTECH ® 11933-19 Titanium Oxide Colorant |
| 0.62% | HYDROCEROL ® CF 40E |
| 2.49% | Ampacet 102823 Process Aid PE MB LLDPE |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr N₂ |

The N₂ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish an insulative container. The insulative container has a density of about 0.750 grams per cubic centimeter.

Example 4

Formulation and Extrusion

DOW® DOWLEX™ IP 41 HDPE was used as the polyethylene base resin. The polyethylene base resin was blended with HYDROCEROL® CF 40E as a nucleating agent and CO₂ as a blowing agent. Ampacet 102823 Process Aid PE MB LLDPE was added as a slip agent and COLORTECH® 11933-19 was added as a colorant. The percentages were about:

| | |
|---|---|
| 98.25% | DOW® DOWLEX™ IP 41 HDPE |
| 0.25% | HYDROCEROL® CF 40E |
| 0.5% | COLORTECH® 11933-19 Titanium Oxide Colorant |
| 1.0% | Ampacet 102823 Process Aid PE MB LLDPE |

The HDPE, nucleating agent, slip agent, and colorant were added to an extruder hopper and blended to provide a formulation. The formulation was then heated in the extruder to form a molten material. The blowing agent was then added to the molten material at a rate of about:

| | |
|---|---|
| 0.09 | lbs/hr $CO_2$ |

The $CO_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish an insulative container. The insulative container has a density of about 0.794 grams per cubic centimeter.

Example 5

Formulation and Extrusion

FORMOSA PLASTICS® FORMOLENE™ HB5502F HDPE hexene copolymer was used as the polyethylene base resin. The polyethylene base resin was blended with HYDROCEROL® CF 40E as a nucleating agent, Heritage Plastics HT6000 LLDPE talc as another nucleating agent, and $N_2$ as a blowing agent. The percentages were about:

| | |
|---|---|
| 98.75% | FORMOLENE(T) HB5502F HDPE hexene copolymer |
| 0.2% | Heritage Plastics HT6000 LLDPE Based Talc Concentrate |
| 0.75% | HYDROCEROL® CF 40E |

The HDPE and nucleating agents were added to an extruder hopper and blended to provide a formulation. The formulation was then heated in the extruder to form a molten material. The blowing agent was then added to the molten material at a rate of about:

| | |
|---|---|
| 0.125 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.399 grams per cubic centimeter. The multi-layer parison was then blow molded to establish an insulative container having a density of about 0.610 grams per cubic centimeter.

Example 6

Formulations and Test Results

FORMOSA PLASTICS® FORMOLENE® HB5502F HDPE hexene copolymer was used as the polyethylene base resin. To that polyethylene base resin, one or more nucleating agents such as HYDROCEROL® CF 40E, Heritage Plastics HT6000 LLDPE talc, or Heritage Plastics HT4HP were added. In addition, $N_2$ or $CO_2$ were added as a blowing agent. Furthermore, in some examples, Ampacet 102823 Process Aid PE MB LLDPE was added as a slip agent and COLORTECH® 11933-19 was added as a colorant. The various formulations and resulting multi-layer parison and insulative container densities are shown below in Table 1.

TABLE 1

Comparison of different insulative cellular non-aromatic polymeric material formulations to create various multi-layer parison and insulative container densities

| Trial | Formosa Base Resin [%] | CF-40E [%] | Additive #2 | Colortech [%] | HT4HP [%] | Gas [lbs/hr] | Bottle Density [g/cm³] | Parison Density [g/cm³] |
|---|---|---|---|---|---|---|---|---|
| 6.1 | 96.5 | 0.5 | 2% Ampacet | 1 | 0 | 0.09 $CO_2$ | 0.797 | 0.481 |
| 6.2 | 95 | 1.5 | 2% Ampacet | 1 | 0.5 | 0.08 $CO_2$ | 0.806 | 0.455 |
| 6.3 | 95 | 1.5 | 2% Ampacet | 1 | 0.5 | 0.11 $CO_2$ | 0.753 | 0.451 |
| 6.4 | 95 | 1.5 | 2% Ampacet | 1 | 0.5 | 0.09 $N_2$ | 0.690 | 0.455 |
| 6.5 | 95 | 1.5 | 2% Ampacet | 1 | 0.5 | 0.09 $N_2$ | 0.693 | 0.447 |
| 6.6 | 95 | 1.5 | 2% Ampacet | 1 | 0.5 | 0.09 $N_2$ | 0.718 | 0.467 |
| 6.7 | 96 | 0.5 | 2% Ampacet | 1 | 0.5 | 0.09 $N_2$ | 0.785 | 0.503 |
| 6.8 | 96 | 0.5 | 2% Ampacet | 1 | 0.5 | 0.09 $N_2$ | 0.788 | 0.516 |
| 6.9 | 96 | 0.5 | 2% Ampacet | 1 | 0.5 | 0.09 $N_2$ | 0.736 | 0.495 |
| 6.10 | 96 | 0.5 | 2% Ampacet | 1 | 0.5 | 0.09 $N_2$ | 0.752 | 0.496 |
| 6.11 | 96 | 0.5 | 2% Ampacet | 1 | 0.5 | 0.09 $N_2$ | 0.749 | 0.473 |
| 6.12 | 96.5 | 0.5 | 2% Ampacet | 1 | 0 | 0.09 $N_2$ | 0.779 | 0.498 |
| 6.13 | 99.9 | 0.1 | | | 0 | 0.03 $N_2$ | 0.918 | 0.785 |
| 6.14 | 99.4 | 0.1 | 0.5% HT6000 | | 0 | 0.1 $N_2$ | 0.730 | 0.502 |
| 6.15 | 97.4 | 0.1 | 2.5% HT6000 | | 0 | 0.125 $N_2$ | 0.632 | 0.434 |

TABLE 1-continued

Comparison of different insulative cellular non-aromatic polymeric material formulations to create various multi-layer parison and insulative container densities

| Trial | Formosa Base Resin [%] | CF-40E [%] | Additive #2 | Colortech [%] | HT4HP [%] | Gas [lbs/hr] | Bottle Density [g/cm³] | Parison Density [g/cm³] |
|---|---|---|---|---|---|---|---|---|
| 6.16 | 99.25 | 0.75 | | | 0 | 0.1 N₂ | 0.723 | 0.688 |
| 6.17 | 98.75 | 0.75 | 0.5% HT6000 | | 0 | 0.125 N₂ | 0.606 | 0.568 |
| 6.18 | 96.75 | 0.75 | 2.5% HT6000 | | 0 | 0.03 N₂ | 0.892 | 0.470 |
| 6.19 | 98 | 2.0 | | | 0 | 0.125 N₂ | 0.481 | 0.416 |
| 6.20 | 97.5 | 2.0 | 0.5% HT6000 | | 0 | 0.03 N₂ | 0.846 | 0.478 |
| 6.21 | 95.5 | 2.0 | 2.5% HT6000 | | 0 | 0.1 N₂ | 0.597 | 0.411 |
| 6.22 | 98.75 | 0.75 | 0.4% HT6000 | | 0 | 0.125 N₂ | 0.573 | 0.414 |

(Gas column values use $N_2$.)

Example 7

Formulations and Test Results

FORMOSA PLASTICS® FORMOLENE® HB5502F HDPE hexene copolymer was used as the polyethylene base resin. To that polyethylene base resin, HYDROCEROL® CF 40E and Heritage Plastics HT6000 LLDPE talc as nucleating agents were added. In addition, $N_2$ was added as a blowing agent. The percentages were about:

| | |
|---|---|
| 98.75% | FORMOLENE(T) HB5502F HDPE hexene copolymer |
| 0.75% | HYDROCEROL ® CF 40E |
| 0.3% | Heritage Plastics HT6000 LLDPE Based Talc Concentrate |

The HDPE and nucleating agents were added to an extruder hopper and blended to provide a formulation. The formulation was then heated in the extruder to form a molten material. A blowing agent was then added to the molten material at a rate of about:

| | |
|---|---|
| 0.12 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.407 grams per cubic centimeter. The multi-layer parison was then blow molded to establish an insulative container having a density of about 0.577 grams per cubic centimeter.

Example 8

Formulation and Extrusion

FORMOSA PLASTICS® FORMOLENE® HB5502F HDPE hexene copolymer and EQUISTAR® ALATHON® H5520 HDPE copolymer were used as polyethylene base resins. The polyethylene base resins were blended with HYDROCEROL® CF 40E as a nucleating agent and Heritage Plastics HT6000 LLDPE talc as another nucleating agent, and $N_2$ as a blowing agent. Ampacet 102823 Process Aid PE MB LLDPE was added as a slip agent and COLORTECH® 11933-19 was added as a colorant. The percentages were about:

| | |
|---|---|
| 47.5% | FORMOLENE ® HB5502F HDPE hexene copolymer |
| 47.5% | EQUISTAR ® ALATHON ® H5520 HDPE copolymer |
| 0.5% | Heritage Plastics HT4HP Talc |
| 1.5% | HYDROCEROL ® CF 40E |
| 2.0% | Ampacet 102823 Process Aid PE MB LLDPE |
| 1.0% | COLORTECH ® 11933-19 Titanium Oxide Colorant |

The HDPE, nucleating agents, slip agents, and colorants were added to an extruder hopper and blended to provide a formulation. The formulation was then heated in the extruder to form a molten material. The blowing agent was then added to the molten material at a rate of about:

| | |
|---|---|
| 0.12 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.396 grams per cubic centimeter. The multi-layer parison was then blow molded to establish an insulative container having a density of about 0.519 grams per cubic centimeter.

Example 9

Formulations and Test Results

FORMOSA PLASTICS® FORMOLENE® HB5502F HDPE hexene copolymer and EQUISTAR® ALATHON® H5520 HDPE copolymer were used as polyethylene base resins. The polyethylene base resins were used in various percentages from about 23.875% to about 74.925% of the formulation. The polyethylene base resins were blended with HYDROCEROL® CF 40E as a nucleating agent and Heritage Plastics HT6000 LLDPE talc as another nucleating agent, and $CO_2$ or $N_2$ as a blowing agent. The blowing agent was used at levels between about 0.3 lbs/hr to about 1.25 lbs/hour. Ampacet 102823 Process Aid PE MB LLDPE was added as a slip agent and COLORTECH® 11933-19 was added as a colorant. In some examples, DOW® AFFINITY™ PL 1880G polyolefin elastomer was added as an impact modifier to the formulation. The various formulations and resulting multi-layer parison and insulative container densities are shown below in Table 2.

TABLE 2

Comparison of different insulative cellular non-aromatic polymeric material formulations to create various multi-layer parison and insulative container densities

| Trial | Formosa Base Resin [%] | Base Resin #2 | Additive #1 | Additive #2 | Additive #3 | Additive #4 | N₂ [lbs/hr] | Bottle Density [g/cm³] | Parison Density [g/cm³] |
|---|---|---|---|---|---|---|---|---|---|
| 9.1 | 47.5 | 47.5% LBI | 1.5% CF-40E | 2% Ampacet | 1% Colortech | 0.5% HT4HP | 0.092 | 0.649 | 0.423 |
| 9.2 | 24.98 | 74.925% LBI 0.25MI | 0.1% CF-40E | | | | 0.03 | 0.906 | 0.771 |
| 9.3 | 24.7 | 74.0625% LBI 0.25MI | 0.75% CF-40E | 0.5% HT6000 | | | 0.1 | 0.668 | 0.611 |
| 9.4 | 23.875 | 71.625% LBI 0.25MI | 2% CF-40E | 2.5% HT6000 | | | 0.125 | 0.851 | 0.720 |
| 9.5 | 49.7 | 49.7% LBI 0.25MI | 0.1% CF-40E | 0.5% HT6000 | | | 0.125 | 0.668 | 0.436 |
| 9.6 | 48.375 | 48.375% LBI 0.25MI | 0.75% CF-40E | 2.5% HT6000 | | | 0.03 | 0.903 | 0.711 |
| 9.7 | 49 | 49% LBI 0.25MI | 2% CF-40E | | | | 0.1 | 0.626 | 0.425 |
| 9.8 | 73.05 | 24.35% LBI 0.25MI | 0.1% CF-40E | 2.5% HT6000 | | | 0.1 | 0.751 | 0.495 |
| 9.9 | 74.44 | 24.8125% LBI 0.25MI | 0.75% CF-40E | | | | 0.125 | 0.578 | 0.422 |
| 9.10 | 73.125 | 24.375% LBI 0.25MI | 2% CF-40E | 0.5% HT6000 | | | 0.03 | 0.858 | 0.566 |
| 9.11 | 42.25 | 42.25% LBI 0.25MI | 15% Dow Impact Mod | 0.1% CF-40E | 0.4% HT6000 | | 0.125 | 0.640 | 0.441 |
| 9.12 | 42.25 | 42.25% LBI 0.25MI | 15% Dow Impact Mod | 0.1% CF-40E | 0.4% HT6000 | | 0.1 | 0.742 | 0.502 |
| 9.13 | 42.25 | 42.25% LBI 0.25MI | 15% Dow Impact Mod | 0.1% CF-40E | 0.4% HT6000 | | 0.1 | 0.735 | 0.508 |
| 9.14 | 42.25 | 42.25% LBI 0.25MI | 15% Dow Impact Mod | 0.1% CF-40E | 0.4% HT6000 | | 0.1 | 0.766 | 0.512 |

Example 10

Formulations and Test Results

FORMOSA PLASTICS® FORMOLENE® HB5502F HDPE hexene copolymer was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and N₂ as a blowing agent. The blowing agent was used at levels between about 0.05 lbs/hr to about 0.15 lbs/hour. COLORTECH® 11933-19 was added as a colorant in some examples. The various formulations and resulting multi-layer parison and insulative container densities are shown below in Table 3.

TABLE 3

Comparison of different insulative cellular non-aromatic polymeric material formulations to create various multi-layer parison and insulative container densities

| Trial | Formosa 5502F [%] | Colortech [%] | CF-40E [%] | HT6000 [%] | N₂ [lbs/hr] | Bottle Density [g/cm³] | Parison Density [g/cm³] |
|---|---|---|---|---|---|---|---|
| 10.1 | 97.95 | 1 | 0.75 | 0.3 | 0.1222 | 0.7183 | * |
| 10.2 | 98 | 0 | 2 | 0 | 0.0529 | 0.6950 | * |
| 10.3 | 99.25 | 0 | 0.75 | 0 | 0.0534 | 0.7296 | * |
| 10.4 | 99 | 0 | 1.0 | 0 | 0.0511 | 0.7404 | 0.4292 |
| 10.5 | 98.7 | 0 | 1.0 | 0.3 | 0.0514 | 0.7316 | 0.4272 |
| 10.6 | 98.45 | 0 | 1.25 | 0.3 | 0.0521 | 0.7309 | 0.4276 |

TABLE 3-continued

Comparison of different insulative cellular non-aromatic polymeric material formulations to create various multi-layer parison and insulative container densities

| Trial | Formosa 5502F [%] | Colortech [%] | CF-40E [%] | HT6000 [%] | $N_2$ [lbs/hr] | Bottle Density [g/cm$^3$] | Parison Density [g/cm$^3$] |
|---|---|---|---|---|---|---|---|
| 10.7 | 98.75 | 0 | 1.25 | 0 | 0.0529 | 0.7303 | 0.4236 |
| 10.8 | 98.75 | 0 | 1.25 | 0 | 0.0522 | 0.7136 | 0.4234 |
| 10.9 | 98.75 | 0 | 1.25 | 0 | 0.0538 | 0.7214 | 0.4304 |
| 10.10 | 100 | 0 | 0 | 0 | 0.1468 | * | * |
| 10.11 | 100 | 0 | 0 | 0 | 0.1392 | * | * |
| 10.12 | 99.9 | 0 | 0 | 0.1 | 0.1393 | * | * |
| 10.13 | 99.5 | 0 | 0 | 0.5 | 0.0656 | * | * |
| 10.14 | 99.4 | 0 | 0.1 | 0.5 | 0.0702 | * | * |
| 10.15 | 99.3 | 0 | 0.2 | 0.5 | 0.0692 | * | * |
| 10.16 | 99.7 | 0 | 0.1 | 0.2 | 0.0673 | * | * |
| 10.17 | 99.7 | 0 | 0.1 | 0.2 | 0.0892 | * | * |
| 10.18 | 99.7 | 0 | 0.1 | 0.2 | 0.105 | * | * |
| 10.19 | 99.7 | 0 | 0.1 | 0.2 | 0.1188 | * | * |
| 10.20 | 99.7 | 0 | 0.1 | 0.2 | 0.0915 | * | * |
| 10.21 | 99.05 | 0 | 0.75 | 0.2 | 0.0906 | * | * |

* Data not available

Example 11

Formulations and Test Results

Bottles were formed from 99.4 wt % FORMOSA PLASTICS® FORMOLENE® HB5502F HDPE hexene copolymer as the polyethylene base resin blended with 0.1 wt % HYDROCEROL® CF 40E as a nucleating agent and 0.5 wt % Heritage Plastics HT6000 LLDPE talc as another nucleating agent with 0.04 lbs/hr of $N_2$ blowing agent. The resulting bottles and parisons were a single layer (i.e., monolayer). The resulting monolayer parison and monolayer container densities are shown under the various process conditions.

TABLE 4

Comparison of process parameters on bottle and parison densities.

| Run [#] | Cycle [s] | Air [psi] | Vacuum | Parison ρ [g/cm$^3$] | Bottle ρ [g/cm$^3$] |
|---|---|---|---|---|---|
| 1 | 14 | 40 | Off | 0.546 | 0.748 |
| 2 | 14 | 40 | On | 0.570 | 0.795 |
| 3 | 14 | 60 | Off | 0.542 | 0.706 |
| 4 | 14 | 60 | On | 0.538 | 0.724 |
| 5 | 15 | 40 | Off | 0.553 | 0.792 |
| 6 | 15 | 40 | On | 0.559 | 0.789 |
| 7 | 15 | 60 | Off | 0.542 | 0.844 |
| 8 | 15 | 60 | On | 0.550 | 0.798 |
| 9 | 16 | 40 | Off | 0.536 | 0.649 |
| 10 | 16 | 40 | On | 0.549 | 0.788 |
| 11 | 16 | 60 | Off | 0.540 | 0.825 |
| 12 | 16 | 60 | On | 0.555 | 0.840 |
| 13 | 17 | 40 | Off | 0.548 | 0.791 |
| 14 | 17 | 40 | On | 0.544 | 0.789 |
| 15 | 17 | 60 | Off | 0.543 | 0.716 |
| 16 | 17 | 60 | On | 0.548 | 0.707 |
| 17 | 18 | 40 | Off | 0.546 | 0.806 |
| 18 | 18 | 40 | On | 0.540 | 0.792 |
| 19 | 18 | 60 | Off | 0.533 | 0.833 |
| 20 | 18 | 60 | On | 0.547 | 0.829 |

Example 12

Formulations and Test Results

FORMOSA PLASTICS® FORMOLENE® HB5502F HDPE hexene copolymer was used as polyethylene base resin. The polyethylene base resin was used in 99.4 wt % of the formulation. The polyethylene base resin was either 100% virgin HDPE (i.e., the control) or a combination of virgin HDPE and regrind. The regrind was a foam bottle produced according to Example 11, ground up, and then put back into the system. The polyethylene base resin was blended with 0.1 wt % HYDROCEROL® CF 40E as a nucleating agent and 0.5 wt % Heritage Plastics HT6000 LLDPE talc as another nucleating agent, and $N_2$ as a blowing agent. The blowing agent was used at about 0.04 lbs/hr. The various formulations and resulting monolayer parison and insulative container densities are shown below in Table 5.

TABLE 5

Comparison of percent virgin and percent regrind on bottle and parison densities.

| Run [#] | Virgin [%] | Regrind [%] | Cycle Time [s] | Parison ρ [g/cm$^3$] | Bottle ρ [g/cm$^3$] |
|---|---|---|---|---|---|
| Control | 100 | 0 | 15 | 0.617 | 0.757 |
| 1 | 80 | 20 | 14 | 0.524 | 0.769 |
| 2 | 80 | 20 | 15 | 0.493 | 0.728 |
| 3 | 80 | 20 | 16 | 0.499 | 0.747 |
| 4 | 60 | 40 | 14 | 0.519 | 0.747 |
| 5 | 60 | 40 | 15 | 0.531 | 0.751 |
| 6 | 60 | 40 | 16 | 0.523 | 0.742 |
| 7 | 40 | 60 | 14 | 0.493 | 0.718 |
| 8 | 40 | 60 | 15 | 0.435 | 0.697 |
| 9 | 40 | 60 | 16 | 0.444 | 0.682 |
| 10 | 20 | 80 | 14 | 0.442 | 0.690 |
| 11 | 20 | 80 | 15 | 0.483 | 0.726 |
| 12 | 20 | 80 | 16 | 0.493 | 0.728 |

The bottles produced with regrind as part of the base polyethylene maintained densities of about 80%.

Another set of bottles was produced as described immediately above except that the regrind was a 2nd pass regrind.

TABLE 6

Comparison of percent virgin and percent 2nd pass regrind on bottle and parison densities.

| Run [#] | Virgin [%] | Regrind [%] | Cycle Time [s] | Parison ρ [g/cm³] | Bottle ρ [g/cm³] |
|---|---|---|---|---|---|
| 1 | 80 | 20 | 14 | 0.536 | 0.773 |
| 2 | 80 | 20 | 15 | 0.502 | 0.764 |
| 3 | 80 | 20 | 16 | 0.496 | 0.778 |

Even with 2nd pass regrind, bottle characteristics were very similar to the characteristics of bottles produced with virgin HDPE.

Example 13

Effect of RPM on Bottle Formation

FORMOSA PLASTICS® FORMOLENE® HB5502F HDPE hexene copolymer was used as polyethylene base resin, at about 99.4%. The polyethylene base resin was blended with 0.1% HYDROCEROL® CF 40E as a nucleating agent and Heritage Plastics HT6000 LLDPE talc as another nucleating agent, and $N_2$ as a blowing agent. The blowing agent was used at about 0.04 lbs/hr. This formulation was processed at various RPMs to produce bottles. Thus, the only variable in the bottle formation of these different runs was the RPMs of the throughput system.

TABLE 7

Effect of RPMs on Drop Test results.

| Run [#] | RPM | Parison ρ [g/cm³] | Bottle ρ [g/cm³] | Weight [g] | Thickness [mils] | Top Load [lbs-F] | Drop Test [Pass %] |
|---|---|---|---|---|---|---|---|
| 5 | 48 | 0.711 | 0.892 | 54.5 | 41.2 | 87.562 | 100 |
| 1 | 36 | 0.660 | 0.842 | 50.2 | 37.7 | 92.696 | 100 |
| 1A | 36 | 0.638 | 0.780 | 51.5 | 43.6 | 89.578 | 100 |
| 2 | 27 | 0.577 | 0.817 | 53.4 | 42.1 | 105.806 | 100 |
| 3 | 18 | 0.495 | 0.756 | 45.0 | 37.0 | 73.94 | 20 |
| 4 | 11 | 0.396 | 0.601 | 32.0 | 30.7 | 36.764 | 0 |

Changing the RPM in the throughput system produced changes to bottle and parison characteristics. For example, higher RPMs produced a higher density parison and higher density bottle. Thereby, using a lower RPM in the throughput system produced lower density bottles. Although these systems utilized a single drop, this shows that a multi-parison drop system is possible. For example, a throughput system can start at a particular RPM (e.g., 48 RPM) for the extrusion stream and then and then split into multiple parison streams at lower RPMs. In an illustrative example, one extrusion stream can start at 48 RPM and split into 4 parison drop streams running at 12 RPM. This would produce a more efficient foaming system to produce bottles.

Example 14

Density Measurements

This Example demonstrates the test used to measure the density of filled and unfilled polymer parts.
Procedure
The density was determined by the apparatus shown, unassembled, in FIG. 4. Although not shown in FIG. 4, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm³, so most unfilled polymers require some other suspension fluid such as isopropyl alcohol, density=0.8808 g/cm³. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

Example 15

Formulations and Test Results

Marlex® HHM 5502BN HDPE hexene copolymer (Chevron Phillips Chemical Company, The Woodlands, Tex.) was used as polyethylene base resin in the core layer. The polyethylene base resin was used in various percentages from about 98% to about 100% of the formulation. In some examples, the polyethylene base resin was blended with HYDROCEROL® CF 40E as a chemical blowing agent in all non-control samples and Heritage Plastics HT4HP talc as another nucleating agent, and $N_2$ as a blowing agent. The blowing agent was used at about 11 kg/hr. The various formulations and resulting multi-layer parison and insulative container densities are shown below in Table 3.

The extruded material was a multi-layer material where the core layer was sandwiched between an outer and inner polymeric layer. The outer and inner layer were comprised of various amounts of Marlex® HHM 5502BN HDPE hexene copolymer (Chevron Phillips). The outer polymeric layer also included 5 wt % colorant (COLORTECH® 11933-19 titanium oxide). The inner polymeric layer did not include a colorant. Some embodiments of the formulations included inner and/or outer polymeric layers comprising a reinforcing fiber (Hyperform® HPR-803i, Milliken & Co., Spartanburg, S.C.).

TABLE 8

Comparison of different insulative cellular non-aromatic polymeric material formulations to create various multi-layer parison and insulative container densities

| Sample | Core Layer | | | Outer Layer | | | Inner Layer | |
|---|---|---|---|---|---|---|---|---|
| | HDPE | CBA | Talc | HDPE | Color | Fiber | HDPE | Fiber |
| Control | 100% | 0% | 0% | 95% | 5% | 0% | 100% | 0% |
| 1-1 | 100% | 0.10% | 0.30% | 95% | 5% | 0% | 100% | 0% |
| 1-2 | 100% | 0.10% | 0.30% | 95% | 5% | 0% | 100% | 0% |
| 1-3 | 100% | 0.10% | 0.30% | 95% | 5% | 0% | 100% | 0% |
| 1-4 | 98.4% | 0.10% | 1.50% | 95% | 5% | 0% | 100% | 0% |
| 1-5 | 98.4% | 0.10% | 1.50% | 95% | 5% | 0% | 100% | 0% |
| 1-6 | 98.4% | 0.10% | 1.50% | 95% | 5% | 0% | 100% | 0% |
| 1-7 | 99.2% | 0.50% | 0.30% | 95% | 5% | 0% | 100% | 0% |
| 1-8 | 99.2% | 0.50% | 0.30% | 95% | 5% | 0% | 100% | 0% |
| 1-9 | 99.2% | 0.50% | 0.30% | 95% | 5% | 0% | 100% | 0% |
| 1-10 | 98.0% | 0.50% | 1.50% | 95% | 5% | 0% | 100% | 0% |
| 1-10A | 98.0% | 0.50% | 1.50% | 80% | 5% | 15% | 85% | 15% |
| 1-11 | 98.0% | 0.50% | 1.50% | 95% | 5% | 0% | 100% | 0% |
| 1-12 | 98.0% | 0.50% | 1.50% | 95% | 5% | 0% | 100% | 0% |
| 1-13 | 99.6% | 0.10% | 0.30% | 85% | 5% | 10% | 100% | 0% |
| 1-14 | 99.6% | 0.10% | 0.30% | 80% | 5% | 15% | 100% | 0% |
| 1-15 | 99.6% | 0.10% | 0.30% | 75% | 5% | 20% | 100% | 0% |

TABLE 9

Effect of formulation on Physical Characteristics, Bottle and Parison Density, and Performance

| Sample | Bottle ρ [g/cm³] | Parison ρ [g/cm³] | Weight [g] | Density [g/cm³] | Water Drop [% passed test] |
|---|---|---|---|---|---|
| Control | | | 23.0 | 0.934 | 100 |
| 1-1 | 0.58 | 0.46 | 17.1 | 0.710 | 70 |
| 1-2 | 0.655 | 0.46 | 16.9 | 0.734 | 80 |
| 1-3 | 0.79 | 0.46 | 17.1 | 0.760 | 70 |
| 1-4 | 0.58 | 0.45 | 17.7 | 0.644 | 90 |
| 1-5 | 0.70 | 0.45 | 17.2 | 0.685 | 100 |
| 1-6 | 0.80 | 0.45 | 16.8 | 0.744 | 80 |
| 1-7 | 0.60 | 0.5 | 17.4 | 0.612 | 60 |
| 1-8 | 0.69 | 0.5 | 17.3 | 0.697 | 100 |
| 1-9 | 0.74 | 0.5 | 17.1 | 0.760 | 100 |
| 1-10 | 0.61 | | 17.0 | 0.625 | 100 |
| 1-10A | 0.47 | | 17.0 | 0.479 | 60 |
| 1-11 | 0.67 | | 17.1 | 0.693 | 100 |
| 1-12 | 0.82 | | 17.5 | 0.784 | 100 |
| 1-13 | 0.61 | | 17.0 | 0.624 | 100 |
| 1-14 | 0.67 | | 17.5 | 0.656 | 90 |
| 1-15 | 0.62 | | 17.1 | 0.665 | 90 |

Example 16

Multi-Layer Tubes Comprising Various Amounts of Chemical Blowing Agent and Formed at Various Temperatures Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company). Core-layer formulation 48 comprised between about 99.2% and about 99.6% Marlex® HHM 5502BN HDPE (available from Chevron Phillips Chemical Company), as shown in Table 10, which was used as a polyethylene base resin. The polyethylene base resin was blended with between about 0.1% and about 0.5% HYDROCEROL® CF 40E as a chemical blowing agent (CBA) and nucleating agent, as shown in Table 10, and about 0.3% Heritage Plastics HT6000 LLDPE talc as another nucleating agent. $N_2$ was used as a blowing agent and was injected into the rest of the molten core-layer formulation 48 at a level of about 0.044 kg/h.

The extruder head temperature was varied between about 180° C. and about 190° C., and the core layer extruder barrel temperature was varied between about 180° C. and about 190° C., as shown in Table 10. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. For each formulation, density was measured for six tubes according to the procedure of Example 2, as shown in Table 11 as Density. The average of the six densities for each formulation is shown as Average Density in Table 11. The melt temperature for each formulation was also determined and is reported in Table 11 as Melt Temp.

TABLE 10

Amount of CBA, amount of HDPE, head temperature, and barrel temperature for tubes of Example 16.

| Trial [#] | CBA [%] | HDPE [%] | Head Temp [° C.] | Barrel Temp [° C.] |
|---|---|---|---|---|
| 12.A.0 | 0.10 | 99.6 | 180 | 180 |
| 12.A.1 | 0.50 | 99.2 | 180 | 180 |
| 12.A.2 | 0.10 | 99.6 | 190 | 180 |
| 12.A.3 | 0.50 | 99.2 | 190 | 180 |
| 12.A.4 | 0.10 | 99.6 | 180 | 190 |
| 12.A.5 | 0.50 | 99.2 | 180 | 190 |
| 12.A.6 | 0.10 | 99.6 | 190 | 190 |
| 12.A.7 | 0.50 | 99.2 | 190 | 190 |

TABLE 11

Density, average density, and melt temperature for tubes of Example 16.

| Trial [#] | Density [g/cm³] | Average Density [g/cm³] | Melt Temp [° C.] |
|---|---|---|---|
| 12.A.0a | 0.488 | 0.493 | 180 |
| 12.A.0b | 0.499 | | |
| 12.A.0c | 0.486 | | |
| 12.A.0d | 0.495 | | |
| 12.A.0e | 0.494 | | |
| 12.A.0f | 0.498 | | |
| 12.A.1a | 0.491 | 0.509 | 180 |
| 12.A.1b | 0.514 | | |
| 12.A.1c | 0.509 | | |
| 12.A.1d | 0.517 | | |
| 12.A.1e | 0.510 | | |
| 12.A.1f | 0.511 | | |
| 12.A.2a | 0.484 | 0.480 | 180 |
| 12.A.2b | 0.486 | | |
| 12.A.2c | 0.470 | | |
| 12.A.2d | 0.486 | | |
| 12.A.2e | 0.474 | | |
| 12.A.2f | 0.482 | | |
| 12.A.3a | 0.500 | 0.504 | 181 |
| 12.A.3b | 0.499 | | |
| 12.A.3c | 0.503 | | |
| 12.A.3d | 0.508 | | |
| 12.A.3e | 0.504 | | |
| 12.A.3f | 0.509 | | |
| 12.A.4a | 0.495 | 0.500 | 190 |
| 12.A.4b | 0.505 | | |
| 12.A.4c | 0.493 | | |
| 12.A.4d | 0.507 | | |
| 12.A.4e | 0.494 | | |
| 12.A.4f | 0.505 | | |
| 12.A.5a | 0.498 | 0.500 | 190 |
| 12.A.5b | 0.506 | | |
| 12.A.5c | 0.486 | | |
| 12.A.5d | 0.507 | | |
| 12.A.5e | 0.495 | | |
| 12.A.5f | 0.510 | | |
| 12.A.6a | 0.484 | 0.492 | 189 |
| 12.A.6b | 0.494 | | |
| 12.A.6c | 0.494 | | |
| 12.A.6d | 0.494 | | |
| 12.A.6e | 0.492 | | |
| 12.A.6f | 0.493 | | |
| 12.A.7a | 0.512 | 0.514 | 190 |
| 12.A.7b | 0.523 | | |
| 12.A.7c | 0.511 | | |
| 12.A.7d | 0.520 | | |
| 12.A.7e | 0.490 | | |
| 12.A.7f | 0.526 | | |

Example 17

Multi-Layer Tubes Formed at Various $N_2$ Flow Rates

Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.034 kg/h and about 0.104 kg/h, as shown in Table 12.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 5.8% of the thickness of the entire tube, the outer layer provided about 6.1% of the thickness of the entire tube, and the core layer provided about 88.2% of the thickness of the entire tube. In another embodiment, the inner layer provided about 5.9% of the thickness of the entire tube, the outer layer provided about 6.1% of the thickness of the entire tube, and the core layer provided about 88.0% of the thickness of the entire tube. The thicknesses for two tubes formed at each $N_2$ flow rate were measured and are described in Table 13 as Outer Layer Thickness, Core Layer Thickness, Inner Layer Thickness, and Total Thickness. For each $N_2$ flow rate, density was measured for four tubes according to the procedure of Example 14, as shown in Table 14 as Parison Density. The average of the four densities for each $N_2$ flow rate is shown as Average Density in Table 14. The melt temperature for each formulation was also determined and is reported in Table 14 as Melt Temp.

TABLE 12

$N_2$ flow rate for tubes of Example 17.

| Trial [#] | $N_2$ Flow Rate [kg/h] |
|---|---|
| 12.B.0 | 0.034 |
| 12.B.1 | 0.044 |
| 12.B.2 | 0.054 |
| 12.B.3 | 0.064 |
| 12.B.4 | 0.074 |
| 12.B.5 | 0.084 |
| 12.B.6 | 0.094 |
| 12.B.7 | 0.104 |

TABLE 13

Outer layer thickness, core layer thickness, inner layer thickness, and total thickness for tubes of Example 17.

| Trial [#] | Outer Layer Thickness [mils] [%] | Core Layer Thickness [mils] [%] | Inner Layer Thickness [mils] [%] | Total Thickness [mils] |
|---|---|---|---|---|
| 12.B.0a | 7.18 (6.0) | 104.24 (86.8) | 8.63 (7.2) | 120.05 |
| 12.B.0b | 6.87 (6.1) | 98.98 (87.4) | 7.44 (6.6) | 113.29 |
| 12.B.1a | 5.46 (4.6) | 106.51 (89.0) | 7.67 (6.4) | 119.64 |
| 12.B.1b | 6.39 (5.4) | 103.43 (87.7) | 8.06 (6.8) | 117.88 |
| 12.B.2a | 6.93 (5.5) | 110.55 (87.6) | 8.76 (6.9) | 126.24 |
| 12.B.2b | 7.25 (5.5) | 114.98 (87.9) | 8.52 (6.5) | 130.75 |

TABLE 13-continued

Outer layer thickness, core layer thickness, inner layer thickness, and total thickness for tubes of Example 17.

| Trial [#] | Outer Layer Thickness [mils] [%] | Core Layer Thickness [mils] [%] | Inner Layer Thickness [mils] [%] | Total Thickness [mils] |
|---|---|---|---|---|
| 12.B.3a | 7.77 (5.8) | 119.12 (88.6) | 7.54 (5.6) | 134.43 |
| 12.B.3b | 7.00 (5.2) | 118.8 (88.7) | 8.07 (6.0) | 133.87 |
| 12.B.4a | 8.79 (6.7) | 115.64 (87.4) | 7.28 (5.5) | 131.71 |
| 12.B.4b | 7.62 (5.5) | 123.04 (89.5) | 6.85 (5.0) | 137.51 |
| 12.B.5a | 8.03 (5.8) | 122.68 (89.4) | 6.56 (4.8) | 137.27 |
| 12.B.5b | 6.81 (5.1) | 119.64 (89.8) | 6.82 (5.1) | 133.27 |
| 12.B.6a | 7.07 (5.2) | 120.52 (89.2) | 7.50 (5.6) | 135.09 |
| 12.B.6b | 6.95 (4.9) | 128.6 (91.2) | 5.43 (3.9) | 140.98 |
| 12.B.7a | 6.60 (6.7) | 84.9 (86.8) | 6.33 (6.5) | 97.83 |
| 12.B.7b | 8.51 (9.1) | 76.01 (81.6) | 8.65 (9.3) | 93.17 |

TABLE 14

Density, average density, and melt temp for tubes of Example 17.

| Trial [#] | Density [g/cm$^3$] | Average Density [g/cm$^3$] | Melt Temp [° C.] |
|---|---|---|---|
| 12.B.0a | 0.554 | 0.542 | 180 |
| 12.B.0b | 0.537 | | |
| 12.B.0c | 0.538 | | |
| 12.B.0d | 0.540 | | |
| 12.B.1a | 0.506 | 0.508 | 180 |
| 12.B.1b | 0.505 | | |
| 12.B.1c | 0.513 | | |
| 12.B.1d | 0.508 | | |
| 12.B.2a | 0.466 | 0.470 | 180 |
| 12.B.2b | 0.472 | | |
| 12.B.2c | 0.472 | | |
| 12.B.2d | 0.468 | | |
| 12.B.3a | 0.425 | 0.431 | 180 |
| 12.B.3b | 0.430 | | |
| 12.B.3c | 0.434 | | |
| 12.B.3d | 0.435 | | |
| 12.B.4a | 0.401 | 0.408 | 180 |
| 12.B.4b | 0.407 | | |
| 12.B.4c | 0.411 | | |
| 12.B.4d | 0.414 | | |
| 12.B.5a | 0.379 | 0.374 | 180 |
| 12.B.5b | 0.370 | | |
| 12.B.5c | 0.372 | | |
| 12.B.5d | 0.375 | | |
| 12.B.6a | 0.393 | 0.398 | 180 |
| 12.B.6b | 0.393 | | |
| 12.B.6c | 0.401 | | |
| 12.B.6d | 0.405 | | |
| 12.B.7a | 0.559 | 0.544 | 180 |
| 12.B.7b | 0.541 | | |
| 12.B.7c | 0.537 | | |
| 12.B.7d | 0.540 | | |

Example 18

Formulations and Test Results for Tubes with about 6% Inner/Outer Layer Thickness and Bottles Formed Therefrom Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.034 kg/h and about 0.104 kg/h as shown in Table 15.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 6.1% of the thickness of the entire tube, the outer layer provided about 5.8% of the thickness of the entire tube, and the core layer provided about 88.2% of the thickness of the entire tube. For each $N_2$ flow rate, the mean density of several tubes was measured according to the procedure of Example 14 and is shown below in Table 15 as Average Tube Density.

For tubes where tube density was not measured, a mold was closed around the tube and a blow needle was inserted into a space formed in the tube and a container was blow molded. For each $N_2$ flow rate, the mean density of several bottles was measured according to the procedure of Example 14 and is shown below in Table 15 as Average Bottle Density.

TABLE 15

$N_2$ flow rate, average tube density, and average bottle density for tubes and bottles of Example 18.

| Trial [#] | $N_2$ Flow Rate [kg/h] | Average Tube Density [g/cm$^3$] | Average Bottle Density [g/cm$^3$] |
|---|---|---|---|
| 13.A.1 | 0.034 | 0.542 | 0.705 |
| 13.A.2 | 0.044 | 0.508 | 0.674 |
| 13.A.3 | 0.054 | 0.470 | 0.674 |
| 13.A.4 | 0.064 | 0.431 | 0.616 |
| 13.A.5 | 0.074 | 0.408 | 0.574 |
| 13.A.6 | 0.084 | 0.374 | 0.553 |
| 13.A.7 | 0.094 | 0.398 | 0.572 |
| 13.A.8 | 0.104 | 0.544 | 0.622 |

* Data not available

Example 19

Formulations and Test Results for Tubes with about 12% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.114 kg/h as shown in Table 16.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube. In one embodiment, the inner layer provided about 10.9% of the thickness of the entire tube, the outer layer provided about 11.1% of the thickness of the entire tube, and the core layer provided about 78.0% of the thickness of the entire tube. For each $N_2$ flow rate, average outer, core, and inner layer thicknesses of the tubes were measured and are shown in Table 16. Also, for each of $N_2$ flow rate, density was measured for four tubes according to the procedure of Example 14 and is shown in Table 17 as Density. The average of the four densities for each $N_2$ flow rate is shown as Average Density in Table 17.

TABLE 16

$N_2$ flow rate, outer layer thickness, core layer thickness, inner layer thickness, and total thickness for tubes of Example 19.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.1 | 0.044 | 14.29 (12.3) | 86.21 (74.5) | 15.29 (13.2) | 115.79 |
| 13.B.1.1 | 0.054 | 13.79 (11.1) | 98.07 (78.8) | 12.54 (10.1) | 124.4 |
| 13.B.2.1 | 0.064 | 13.04 (10.8) | 93.23 (77.3) | 14.29 (11.9) | 120.56 |
| 13.B.3.1 | 0.074 | 13.37 (10.8) | 97.92 (79.3) | 12.2 (9.9) | 123.49 |
| 13.B.4.1 | 0.084 | 13.12 (9.9) | 105.76 (79.7) | 13.79 (10.4) | 132.67 |
| 13.B.5.1 | 0.094 | 13.70 (11.3) | 94.82 (78.2) | 12.7 (10.5) | 121.22 |
| 13.B.6.1 | 0.104 | 13.62 (11.8) | 90.23 (78.3) | 11.36 (9.9) | 115.21 |
| 13.B.7.1 | 0.114 | 13.46 (11.0) | 95.15 (77.5) | 14.13 (11.5) | 122.74 |

TABLE 17

Density and average density for tubes of Example 19.

| Trial [#] | Density [g/cm³] | Average Density [g/cm³] |
|---|---|---|
| 13.B.0.1a | 0.567 | 0.563 |
| 13.B.0.1b | 0.553 | |
| 13.B.0.1c | 0.571 | |
| 13.B.0.1d | 0.559 | |
| 13.B.1.1a | 0.539 | 0.529 |
| 13.B.1.1b | 0.534 | |
| 13.B.1.1c | 0.517 | |
| 13.B.1.1d | 0.526 | |
| 13.B.2.1a | 0.507 | 0.500 |
| 13.B.2.1b | 0.503 | |
| 13.B.2.1c | 0.487 | |
| 13.B.2.1d | 0.502 | |
| 13.B.3.1a | 0.484 | 0.479 |
| 13.B.3.1b | 0.479 | |
| 13.B.3.1c | 0.478 | |
| 13.B.3.1d | 0.476 | |
| 13.B.4.1a | 0.437 | 0.431 |
| 13.B.4.1b | 0.428 | |
| 13.B.4.1c | 0.431 | |
| 13.B.4.1d | 0.427 | |
| 13.B.5.1a | 0.430 | 0.432 |
| 13.B.5.1b | 0.421 | |
| 13.B.5.1c | 0.445 | |
| 13.B.5.1d | 0.433 | |
| 13.B.6.1a | 0.491 | 0.489 |
| 13.B.6.1b | 0.466 | |
| 13.B.6.1c | 0.497 | |
| 13.B.6.1d | 0.502 | |
| 13.B.7.1a | 0.528 | 0.494 |
| 13.B.7.1b | 0.525 | |
| 13.B.7.1c | 0.464 | |
| 13.B.7.1d | 0.460 | |

Example 20

Formulations and Test Results for Bottles with about 12% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. N₂ was used as a blowing agent and was injected into the rest of the molten core-layer formulation 48 at levels between about 0.044 kg/h and about 0.114 kg/h as shown in Table 18.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube.

A mold was closed around the tube and a blow needle was inserted into a space formed in the tube and a container was blow molded. After molding, the inner layer of the bottle provided about 15% of the thickness of the entire bottle, the outer layer of the bottle provided about 15% of the thickness of the entire bottle, and the core layer of the bottle provided about 70% of the thickness of the entire bottle. In one embodiment, the inner layer of the bottle provided about 13.2% of the thickness of the entire bottle, the outer layer of the bottle provided about 17.5% of the thickness of the entire bottle, and the core layer of the bottle provided about 69.3% of the thickness of the entire bottle. In this embodiment, blow molding caused the inner layer's contribution to bottle thickness to increase by 20.9%, the outer layer's contribution to bottle thickness to increase by 57.4%, and the core layer's contribution to bottle thickness to decrease by 11.1%. The thicknesses for two tubes formed at each N₂ flow rate were measured and are described in Table 18 as Outer Layer Thickness, Core Layer Thickness, Inner Layer Thickness, and Total Thickness. Also, for each of N₂ flow rate, density was measured for three bottles according to the procedure of Example 14 and is shown in Table 19 as Bottle Density. The average of the four densities for each N₂ flow rate is shown as Average Bottle Density in Table 19. Mean weight of several bottles was measured and is shown in Table 19.

TABLE 18

N₂ flow rate, outer layer thickness, core layer thickness, inner layer thickness, and total thickness for bottles of Example 20.

| Trial [#] | N₂ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.2 | 0.044 | 8.98 (19.3) | 30.5 (65.7) | 6.94 (15.0) | 46.42 |
| 13.B.1.2 | 0.054 | 7.39 (19.5) | 25.07 (66.2) | 5.4 (14.3) | 37.86 |
| 13.B.2.2 | 0.064 | 5.73 (17.9) | 21.28 (66.3) | 5.08 (15.8) | 32.09 |
| 13.B.3.2 | 0.074 | 7.59 (21.2) | 22.59 (63.1) | 5.64 (15.7) | 35.82 |
| 13.B.4.2 | 0.084 | 4.79 (15.3) | 23.16 (73.8) | 3.45 (11.0) | 31.4 |
| 13.B.5.2 | 0.094 | 6.6 (13.6) | 37.47 (77.0) | 4.6 (9.5) | 48.67 |
| 13.B.6.2 | 0.104 | 8.65 (20.1) | 28.1 (65.2) | 6.38 (14.8) | 43.13 |
| 13.B.7.2 | 0.114 | 8.27 (13.4) | 47.55 (77.1) | 5.85 (9.5) | 61.67 |

TABLE 19

Bottle density, average bottle density, and bottle weight for bottles of Example 20.

| Trial [#] | Bottle Density [g/cm³] | Average Bottle density [g/cm³] | Bottle Weight [g] |
|---|---|---|---|
| 13.B.0.2a | 0.748 | 0.758 | 20.30 |
| 13.B.0.2b | 0.763 | | |
| 13.B.0.2c | 0.762 | | |
| 13.B.1.2a | 0.715 | 0.728 | 19.54 |
| 13.B.1.2b | 0.737 | | |
| 13.B.1.2c | 0.733 | | |
| 13.B.2.2a | 0.718 | 0.716 | 18.89 |
| 13.B.2.2b | 0.713 | | |
| 13.B.2.2c | 0.717 | | |
| 13.B.3.2a | 0.677 | 0.670 | 18.47 |
| 13.B.3.2b | 0.659 | | |
| 13.B.3.2c | 0.674 | | |
| 13.B.4.2a | 0.624 | 0.636 | 17.71 |
| 13.B.4.2b | 0.622 | | |
| 13.B.4.2c | 0.662 | | |
| 13.B.5.2a | 0.623 | 0.594 | 17.19 |
| 13.B.5.2b | 0.585 | | |
| 13.B.5.2c | 0.575 | | |
| 13.B.6.2a | 0.593 | 0.576 | 16.69 |
| 13.B.6.2b | 0.545 | | |
| 13.B.6.2c | 0.590 | | |
| 13.B.7.2a | 0.571 | 0.555 | 16.85 |
| 13.B.7.2b | 0.522 | | |
| 13.B.7.2c | 0.573 | | |

Example 21

Formulations and Test Results for Tubes with about 18% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem).

Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.124 kg/h as shown in Table 20.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube. In one embodiment, the inner layer provided about 15.1% of the thickness of the entire tube, the outer layer provided about 17.1% of the thickness of the entire tube, and the core layer provided about 67.8% of the thickness of the entire tube. For each $N_2$ flow rate, average outer, core, and inner layer thicknesses of the tubes were measured and are shown in Table 20. Also, for each $N_2$ flow rate, density was measured for four tubes according to the procedure of Example 14 and is shown in Table 21 as Density. The average of the four densities for each $N_2$ flow rate is shown as Average Density in Table 21.

TABLE 20

$N_2$ flow rate, outer layer thickness, core layer thickness, inner layer thickness, and total thickness for tubes of Example 21.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.1 | 0.044 | 25.32 (20.5) | 75.52 (61.2) | 22.64 (18.3) | 123.48 |
| 13.C.1.1 | 0.054 | 21.47 (16.8) | 84.05 (65.8) | 22.14 (17.3) | 127.66 |
| 13.C.2.1 | 0.074 | 18.13 (14.5) | 91.65 (73.1) | 15.54 (12.4) | 125.32 |
| 13.C.3.1 | 0.084 | 18.48 (14.5) | 89.08 (69.8) | 20.1 (15.7) | 127.66 |
| 13.C.4.1 | 0.094 | 18.63 (15.6) | 83.14 (69.7) | 17.46 (14.6) | 119.23 |
| 13.C.5.1 | 0.104 | 19.47 (17.3) | 77.6 (68.8) | 15.72 (13.9) | 112.79 |
| 13.C.6.1 | 0.114 | 20.56 (19.3) | 71.17 (66.9) | 14.62 (13.7) | 106.35 |
| 13.C.7.1 | 0.124 | 19.63 (23.0) | 49.96 (58.6) | 15.71 (18.4) | 85.3 |
| 13.C.8.1 | 0.064 | 19.55 (15.5) | 87.64 (69.6) | 18.8 (14.9) | 125.99 |

TABLE 21

Density and average density for tubes of Example 21.

| Trial [#] | Density [g/cm³] | Average Density [g/cm³] |
|---|---|---|
| 13.C.0.1a | 0.601 | 0.605 |
| 13.C.0.1b | 0.599 | |
| 13.C.0.1c | 0.608 | |
| 13.C.0.1d | 0.610 | |
| 13.C.1.1a | 0.582 | 0.575 |
| 13.C.1.1b | 0.561 | |
| 13.C.1.1c | 0.579 | |
| 13.C.1.1d | 0.579 | |
| 13.C.2.1a | 0.514 | 0.512 |
| 13.C.2.1b | 0.533 | |
| 13.C.2.1c | 0.500 | |
| 13.C.2.1d | 0.500 | |
| 13.C.3.1a | 0.490 | 0.482 |
| 13.C.3.1b | 0.491 | |
| 13.C.3.1c | 0.477 | |
| 13.C.3.1d | 0.468 | |
| 13.C.4.1a | 0.442 | 0.504 |
| 13.C.4.1b | 0.517 | |
| 13.C.4.1c | 0.501 | |
| 13.C.4.1d | 0.555 | |

TABLE 21-continued

Density and average density for tubes of Example 21.

| Trial [#] | Density [g/cm³] | Average Density [g/cm³] |
|---|---|---|
| 13.C.5.1a | 0.474 | 0.518 |
| 13.C.5.1b | 0.581 | |
| 13.C.5.1c | 0.460 | |
| 13.C.5.1d | 0.555 | |
| 13.C.6.1a | 0.503 | 0.576 |
| 13.C.6.1b | 0.627 | |
| 13.C.6.1c | 0.531 | |
| 13.C.6.1d | 0.644 | |
| 13.C.7.1a | 0.610 | 0.506 |
| 13.C.7.1b | 0.469 | |
| 13.C.7.1c | 0.538 | |
| 13.C.7.1d | 0.406 | |
| 13.C.8.1a | 0.496 | 0.496 |
| 13.C.8.1b | 0.494 | |
| 13.C.8.1c | 0.485 | |
| 13.C.8.1d | 0.508 | |

Example 22

Formulations and Test Results for Bottles with about 18% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.124 kg/h as shown in Table 22.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube.

A mold was closed around the tube and a blow needle was inserted into a space formed in the tube and a container was blow molded. After molding, the inner layer of the bottle provided about 22% of the thickness of the entire bottle, the outer layer of the bottle provided about 22% of the thickness of the entire bottle, and the core layer of the bottle provided about 56% of the thickness of the entire bottle. In one embodiment, the inner layer of the bottle provided about 20.1% of the thickness of the entire bottle, the outer layer of the bottle provided about 24.2% of the thickness of the entire bottle, and the core layer of the bottle provided about 55.7% of the thickness of the entire bottle. In this embodiment, blow molding caused the inner layer's contribution to bottle thickness to increase by 32.7%, the outer layer's contribution to bottle thickness to increase by 41.7%, and the core layer's contribution to bottle thickness to decrease by 17.8%. The thicknesses for two tubes formed at each $N_2$ flow rate were measured and are described in Table 21 as Outer Layer Thickness, Core Layer Thickness, Inner Layer Thickness, and Total Thickness. Also, for each of $N_2$ flow rate, density was measured for three bottles according to the procedure of Example 14 and is shown in Table 23 as Bottle density. The average of the four densities for each $N_2$ flow rate is shown as Average Bottle Density in Table 23. Mean weight of several bottles was measured and is shown in Table 46.

TABLE 22

$N_2$ flow rate, outer layer thickness, core layer thickness, inner layer thickness, and total thickness for bottles of Example 22.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.2 | 0.044 | 11.45 (28.6) | 20.86 (52.1) | 7.72 (19.3) | 40.03 |
| 13.C.1.2 | 0.054 | 7.72 (26.3) | 14.01 (47.7) | 7.64 (26.0) | 29.37 |
| 13.C.2.2 | 0.074 | 10.03 (24.8) | 22.72 (56.1) | 7.76 (19.2) | 40.51 |
| 13.C.3.2 | 0.084 | 9.55 (24.9) | 21.59 (56.4) | 7.15 (18.7) | 38.29 |
| 13.C.4.2 | 0.094 | 8.73 (26.0) | 17.42 (51.8) | 7.47 (22.2) | 33.62 |
| 13.C.5.2 | 0.104 | 9.91 (29.1) | 16.29 (47.8) | 7.88 (23.1) | 34.08 |
| 13.C.6.2 | 0.114 | 7.51 (19.8) | 22.54 (59.4) | 7.92 (20.9) | 37.97 |
| 13.C.7.2 | 0.124 | 10.03 (14.1) | 52.99 (74.3) | 8.27 (11.6) | 71.29 |
| 13.C.8.2 | 0.064 | 10.4 (28.5) | 19.1 (52.4) | 6.98 (19.1) | 36.48 |

TABLE 23

Density and average density for tubes of Example 22.

| Trial [#] | Density [g/cm³] | Average Density [g/cm³] |
|---|---|---|
| 13.C.0.1a | 0.601 | 0.605 |
| 13.C.0.1b | 0.599 | |
| 13.C.0.1c | 0.608 | |
| 13.C.0.1d | 0.610 | |
| 13.C.1.1a | 0.582 | 0.575 |
| 13.C.1.1b | 0.561 | |
| 13.C.1.1c | 0.579 | |
| 13.C.1.1d | 0.579 | |
| 13.C.2.1a | 0.514 | 0.512 |
| 13.C.2.1b | 0.533 | |
| 13.C.2.1c | 0.500 | |
| 13.C.2.1d | 0.500 | |
| 13.C.3.1a | 0.490 | 0.482 |
| 13.C.3.1b | 0.491 | |
| 13.C.3.1c | 0.477 | |
| 13.C.3.1d | 0.468 | |
| 13.C.4.1a | 0.442 | 0.504 |
| 13.C.4.1b | 0.517 | |
| 13.C.4.1c | 0.501 | |
| 13.C.4.1d | 0.555 | |
| 13.C.5.1a | 0.474 | 0.518 |
| 13.C.5.1b | 0.581 | |
| 13.C.5.1c | 0.460 | |
| 13.C.5.1d | 0.555 | |
| 13.C.6.1a | 0.503 | 0.576 |
| 13.C.6.1b | 0.627 | |
| 13.C.6.1c | 0.531 | |
| 13.C.6.1d | 0.644 | |
| 13.C.7.1a | 0.610 | 0.506 |
| 13.C.7.1b | 0.469 | |
| 13.C.7.1c | 0.538 | |
| 13.C.7.1d | 0.406 | |
| 13.C.8.1a | 0.496 | 0.496 |
| 13.C.8.1b | 0.494 | |
| 13.C.8.1c | 0.485 | |
| 13.C.8.1d | 0.508 | |

Example 23

Formulations and Test Results for Tubes with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h, corresponding to between about 0.20% and about 0.30% as shown in Table 24.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube. The layer thicknesses for several tubes of flow rate were measured and the mean values of these thicknesses for each tube are described in Table 24 as Inner Layer Thickness and Outer Layer Thickness.

TABLE 24

$N_2$ saturation, $N_2$ flow rate, inner layer thickness, and outer layer thickness, and total thickness for tubes of Example 23.

| Trial [#] | $N_2$ Saturation [%] | $N_2$ Flow Rate [kg/h] | Inner Layer Thickness [%] | Outer Layer Thickness [mils] |
|---|---|---|---|---|
| 14.A.1 | 0.20 | 0.045 | 11.65 | 16.55 |
| 14.A.2 | 0.22 | 0.0495 | 11.55 | 16.15 |
| 14.A.3 | 0.24 | 0.054 | 11.65 | 16.55 |
| 14.A.4 | 0.26 | 0.0585 | * | * |
| 14.A.5 | 0.28 | 0.0629 | * | * |
| 14.A.6 | 0.30 | 0.069 | * | * |

* Data not available

Example 24

Formulations and Test Results for Bottles with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h as shown in Table 25.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube and a container was blow molded. For each $N_2$ flow rate, the weight of three bottles was measured and is shown in Table 25 as Bottle Weight. The average of the three weights for each $N_2$ flow rate is shown as Average Bottle Weight in Table 25. Also, for each $N_2$ flow rate, density was measured for three bottles according to the procedure of Example 14 and is shown in Table 25 as Bottle Density. The mean of the three densities for each $N_2$ flow rate is shown as Average Bottle Density in Table 25.

TABLE 25

$N_2$ flow rate, bottle weight, average bottle weight, bottle density, and average bottle density for bottles of Example 24.

| Trial [#] | $N_2$ Flow Rate [kg/h] | Bottle Weight [g] | Average Bottle Weight [g] | Bottle density [g/cm³] | Average Bottle density [g/cm³] |
|---|---|---|---|---|---|
| 14.A.1a | 0.045 | 17.21 | 17.3 | 0.710 | 0.710 |
| 14.A.1b | | 17.08 | | 0.703 | |
| 14.A.1c | | 17.61 | | 0.718 | |
| 14.A.2a | 0.0495 | 17.01 | 16.9 | 0.694 | 0.700 |
| 14.A.2b | | 17.01 | | 0.696 | |
| 14.A.2c | | 16.7 | | 0.697 | |
| 14.A.3a | 0.054 | 17.08 | 17.0 | 0.674 | 0.670 |
| 14.A.3b | | 16.96 | | 0.671 | |
| 14.A.3c | | 16.95 | | 0.668 | |
| 14.A.4a | 0.0585 | 17.38 | 17.4 | 0.651 | 0.653 |
| 14.A.4b | | 17.5 | | 0.655 | |
| 14.A.4c | | 17.36 | | 0.653 | |
| 14.A.5a | 0.0629 | 17.14 | 17.2 | 0.653 | 0.646 |
| 14.A.5b | | 17.17 | | 0.642 | |
| 14.A.5c | | 17.16 | | 0.644 | |
| 14.A.6a | 0.069 | 16.84 | 16.9 | 0.640 | 0.642 |
| 14.A.6b | | 16.91 | | 0.649 | |
| 14.A.6c | | 16.81 | | 0.637 | |

Example 25

Formulations and Test Results for Tubes with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company). In some embodiments, the inner-layer formulation 40 comprises about 3% to about 7.5% reinforcing fiber.

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h, corresponding to between about 0.20% and about 0.30% as shown in Table 26.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube. The layer thicknesses for several tubes of flow rate were measured and the mean values of these thicknesses for each tube are described in Table 26 as Inner Layer Thickness and Outer Layer Thickness.

TABLE 26

$N_2$ saturation, $N_2$ flow rate, inner layer thickness, and outer layer thickness, and total thickness for tubes of Example 25.

| Trial [#] | $N_2$ Saturation [%] | $N_2$ Flow Rate [kg/h] | Inner Layer Thickness [%] | Outer Layer Thickness [%] |
|---|---|---|---|---|
| 14.A.7 | 0.20 | 0.045 | 7.30 | 16.85 |
| 14.A.8 | 0.22 | 0.0495 | 9.05 | 15.15 |
| 14.A.9 | 0.24 | 0.054 | 8.85 | 17.2 |
| 14.A.10 | 0.26 | 0.0585 | 11.8 | 18.9 |
| 14.A.11 | 0.28 | 0.0629 | * | * |
| 14.A.12 | 0.30 | 0.069 | * | * |

* Data not available

Example 26

Formulations and Test Results for Bottles with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h as shown in Table 27.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube and a container was blow molded. For each $N_2$ flow rate, the weight of three bottles was measured and is shown in Table 27 as Bottle Weight. The average of the three weights for each $N_2$ flow rate is shown as Average Bottle Weight in Table 27. Also, for each $N_2$ flow rate, density was measured for three bottles according to the procedure of Example 14 and is shown in Table 27 as Bottle Density. The mean of the three densities for each $N_2$ flow rate is shown as Average Bottle Density in Table 27.

TABLE 27

$N_2$ flow rate, bottle weight, average bottle weight, bottle density, and average bottle density for bottles of Example 26.

| Trial [#] | $N_2$ Flow Rate [kg/h] | Bottle Weight [g] | Average Bottle Weight [g] | Bottle density [g/cm$^3$] | Average Bottle density [g/cm$^3$] |
|---|---|---|---|---|---|
| 14.A.7a | 0.045 | 17.02 | 17.0 | 0.694 | 0.691 |
| 14.A.7b | | 17.13 | | 0.700 | |
| 14.A.7c | | 16.81 | | 0.678 | |
| 14.A.8a | 0.0495 | 17.23 | 17.2 | 0.669 | 0.659 |
| 14.A.8b | | 17.2 | | 0.652 | |
| 14.A.8c | | 17.3 | | 0.657 | |
| 14.A.9a | 0.054 | 17.26 | 17.2 | 0.606 | 0.618 |
| 14.A.9b | | 17.24 | | 0.641 | |
| 14.A.9c | | 17.18 | | 0.607 | |
| 14.A.10a | 0.0585 | 16.85 | 16.9 | 0.617 | 0.600 |
| 14.A.10b | | 16.93 | | 0.593 | |
| 14.A.10c | | 16.9 | | 0.590 | |
| 14.A.11a | 0.0629 | 17.31 | 17.2 | 0.562 | 0.569 |
| 14.A.11b | | 17.09 | | 0.589 | |
| 14.A.11c | | 17.21 | | 0.557 | |
| 14.A.12a | 0.069 | 17 | 17.1 | 0.601 | 0.585 |
| 14.A.12b | | 17.31 | | 0.577 | |
| 14.A.12c | | 17.11 | | 0.578 | |

Example 27

Formulations and Test Results for Bottles with Varying Process Aid

Outer-layer formulation 44 comprised between about 72% and about 75% of a base resin blend of 50% Marlex® HHM 5502BN HDPE (available from Chevron Phillips Chemical Company) and 50% DOW LLDPE 5004I Polyethylene, Low Density (available from the Dow Chemical Company) about 5% Ampacet 112761 White Polyethylene Masterbatch (available from Ampacet Corporation) as a coloring agent, about 20% of a reinforcing fiber blend of about 15% Hyperform® HPR-803i (available from Milliken Chemical) and about 85% Braskem F020HC High Crystallinity Polypropylene (available from Braskem), and between about 0% and about 3% of an Ampacet 102823 as a process aid. Inner-layer formulation 40 comprised about 100% Marlex® HHM 5502BN HDPE (available from Chevron Phillips Chemical Company). The outer-layer formulation is further described in Table 28.

Core-layer formulation 48 comprised between about 99.6% and about 99.9% Marlex® HHM 5502BN HDPE (available from Chevron Phillips Chemical Company), which was used as a polyethylene base resin. The polyethylene base resin was blended with between about 0.1% and about 0.3% HYDROCEROL® CF 40E as a chemical blowing agent and nucleating agent and between about 0.1% and about 0.3% Heritage Plastics HT6000 LLDPE talc as another nucleating agent. $N_2$ was used as a blowing agent and was injected into the rest of the molten core-layer formulation 48 at a level between of about 0.060 kg/h. The core-layer formulation is further described in Table 28.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube and a container was blow molded. For each $N_2$ flow rate, the weight of ten bottles was measured. The average of the ten weights for each $N_2$ flow rate is shown as Average Bottle Weight in Table 29. Also, for each $N_2$ flow rate, density was measured for three bottles according to the procedure of Example 14 and is shown in Table 29 as Bottle Density. The mean of the three densities for each $N_2$ flow rate is shown as Average Bottle Density in Table 29.

TABLE 28

Amounts base resin blend, process aid, HDPE, talc, and chemical blowing agent for bottles of Example 27.

| Trial [#] | Outer Layer | | Core Layer | | |
|---|---|---|---|---|---|
| | Base resin blend [%] | 102823 [%] | 5502BN [%] | HT6000 [%] | CF 40E [%] |
| 14.B.1 | 75 | 0 | 99.6 | 0.3 | 0.1 |
| 14.B.2 | 75 | 0 | 99.9 | 0 | 0.1 |
| 14.B.3 | 75 | 0 | 99.7 | 0 | 0.3 |
| 14.B.4 | 72 | 3 | 99.6 | 0.3 | 0.1 |
| 14.B.5 | 72 | 3 | 99.9 | 0 | 0.1 |
| 14.B.6 | 72 | 3 | 99.7 | 0 | 0.3 |
| 14.B.7 | 75 | 0 | 99.9 | 0 | 0.1 |

TABLE 29

Average bottle weight, bottle density, and average bottle density for bottles of Example 27.

| Trial [#] | Average Bottle Weight [g] | Bottle density [g/cm³] | Average Bottle density [g/cm³] |
|---|---|---|---|
| 14.B.1a | 17.1 ± 0.3 | 0.672 | 0.68 |
| 14.B.1b | | 0.683 | |
| 14.B.1c | | 0.690 | |
| 14.B.2a | 17.0 ± 0.1 | 0.669 | 0.67 |
| 14.B.2b | | 0.678 | |
| 14.B.2c | | 0.676 | |
| 14.B.3a | 17.1 ± 0.2 | 0.665 | 0.67 |
| 14.B.3b | | 0.675 | |
| 14.B.3c | | 0.669 | |
| 14.B.4a | 17.0 ± 0.4 | 0.670 | 0.67 |
| 14.B.4b | | 0.676 | |
| 14.B.4c | | 0.676 | |
| 14.B.5a | 17.2 ± 0.2 | 0.681 | 0.68 |
| 14.B.5b | | 0.670 | |
| 14.B.5c | | 0.674 | |
| 14.B.6a | 17.0 ± 0.2 | 0.672 | 0.67 |
| 14.B.6b | | 0.665 | |
| 14.B.6c | | 0.667 | |
| 14.B.7a | 17.1 ± 0.2 | 0.657 | 0.65 |
| 14.B.7b | | 0.655 | |
| 14.B.7c | | 0.648 | |

Example 28

Formulation and Test Results for Bottles with 50% Regrind

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 50% first-pass regrind material and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube and a container was blow molded. The weights of three bottles were measured to be 17.25 g, 17.16 g, and 17.39 g leading to an average weight of 17.3 g. Also, density was measured for three bottles according to the procedure of Example 14 to be 0.689 g/cm$^3$, 0.676 g/cm$^3$, and 0.680 g/cm$^3$ leading to an average density of 0.682 g/cm$^3$.

Example 29

Formulations and Test Results for Bottles with Various Amounts of Regrind

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised between about 0% and about 50% first-pass regrind material, as shown in Table 28, and between about 0% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 48 at a level that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube and a container was blow molded. The average of the weights for each $N_2$ flow rate is shown as Average Bottle Weight in Table 30. Also, for each formulation, density was measured for several bottles according to the procedure of Example 14. The mean of the densities for each formulation is shown as Average Bottle Density in Table 30.

TABLE 30

Amount of regrind, average bottle weight, bottle density, and average bottle density for bottles of Example 29.

| Trial [#] | Regrind [%] | Average Bottle Density [g/cm$^3$] |
|---|---|---|
| 16.A.1 | 0 | 0.685 ± 0.008 |
| 16.B.1 | 25 | 0.690 ± 0.004 |
| 16.B.2 | 50 | 0.670 ± 0.015 |

Example 30

Formulations and Test Results for Bottles with Various Amounts of Regrind

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised between about 0% and about 50% regrind material, as shown in Table 31, and between about 0% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. Several stages of bottles production were performed using different amounts of multiple-pass regrind, as shown in Table 31. First pass regrind was obtained from bottles made of virgin material (stage 0), second pass regrind was obtained from bottles made of material from stage 1, third pass regrind was obtained from bottles made of material from stage 2, fourth pass regrind was obtained from bottles made of material from stage 3, fifth pass regrind was obtained from bottles made of material from stage 4, and sixth pass regrind was obtained from bottles made of material from stage 5. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 14% of the thickness of the entire tube, the outer layer provided about 14% of the thickness of the entire tube, and the core layer provided about 72% of the thickness of the entire tube.

A mold was closed around the tube and a blow needle was inserted into a space formed in the tube and a container was blow molded.

TABLE 31

Pass level of regrind material used in different stages of production of bottles of Example 30.

| | Regrind Stage | | | | | | |
|---|---|---|---|---|---|---|---|
| | Stage 0 | Stage 1 | Stage 2 | Stage 3 | Stage 4 | Stage 5 | Stage 6 |
| Virgin   | 100.00% | 50.00% | 50.00% | 50.00% | 50.00% | 50.00% | 50.00% |
| 1st Pass |         | 50.00% | 25.00% | 25.00% | 25.00% | 25.00% | 25.00% |
| 2nd Pass |         |        | 25.00% | 12.50% | 12.50% | 12.50% | 12.50% |
| 3rd Pass |         |        |        | 12.50% | 6.25%  | 6.25%  | 6.25%  |
| 4th Pass |         |        |        |        | 6.25%  | 3.13%  | 3.13%  |
| 5th Pass |         |        |        |        |        | 3.13%  | 1.56%  |
| 6th Pass |         |        |        |        |        |        | 1.56%  |

Example 31

Top Load Measurement Method

Top Load Measurements
General Procedure

Top load testing determines how much force a container can withstand before the container fails or necks in to form an hourglass shape. Various containers 10 were subjected to top load testing. An Instron tester, such as and generally consistent with an Instron Series 5500 Load Frame, may be used to determine top load performance The top load test was generally performed according to the following procedure. A container was placed on a flat surface such that the floor of the container was arranged to lie in a substantially parallel relation to the flat surface. A crosshead of the Instron tester applied a compressive force to the top of the neck of the container. A load transducer, mounted in series with the container, measured the applied load. Containers 10 were tested until they failed or necked in to form an hourglass shape. Once failure or necking was observed, the value shown on Instron tester was recorded.

Example 32

Parison Cell Counting Method

General Procedure

Parison cell counting is a measurement of the quality of the foam of the extruded material. The extruded material, for example a parison, is cut in cross sections and viewed with microscopy. The number of cells are counted in a given unit volume, for example cubic inches.

A square of the sample to be subjected to the parison cell counting method is cut out from the center of the parison. The excised square of the parison is then divided by cutting across the diagonal exposing the underlying cell structure. The cells are then visualized and counted using microscopy.

Example 33

Formulations and Test Results for Tubes with Varying LDPE

Outer-layer formulation 44 comprised about 95% Dow DMDA 6400 NT7 and about 5% Ampacet 11078 as a white colorant. Inner-layer formulation 40 comprised about 100% Marlex® HHM 5502BN HDPE (available from Chevron Phillips Chemical Company).

Core-layer formulation 48 comprised a percentage of DOW DMDA 6400 NT7 as shown in Table 32, a percentage of DOW™ LDPE 692 LDPE HEALTH+™ as shown in Table 32 to form a core masterbatch that was about 98.9% of the overall formulation, about 0.1% HYDROCEROL® CF 40E as a chemical blowing agent and nucleating agent, and about 1% Heritage Plastics HT4HP talc as another nucleating agent. The $N_2$ was introduced at about 0.032 kg/h. The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 15% of the thickness of the entire tube, the outer layer provided about 15% of the thickness of the entire tube, and the core layer provided about 70% of the thickness of the entire tube. The multi-layer tube was blow molded to form a container, as shown for example in FIG. 8, to provide a multi-layer bottle wherein the inner layer is about 30%, the outer layer is about 30% and the core layer is about 40% of the total bottle thickness. The Top Load performance was measured according to the Top Load Method described in Example 31, and the results are shown in Table 32. The parison was analyzed using the Cell Count of Parison Method described in Example 32, and the results are shown in Table 32. Table 32 shows the parison densities, the cell count of the parison in the diagonal, the bottle density, and the top load measurement.

TABLE 32

Characteristics of the parison and bottles formed in Example 33.

| Percentage LDPE | Parison Density (g/cm³) | Cell count of parison in diagonal | Bottle Density(g/cm³) | Top Load (lbsF) |
|---|---|---|---|---|
| 0   | 0.526 | 1,081,339 | 0.710 | 91.42 |
| 10  | 0.531 | 1,712,299 | 0.723 | 92.21 |
| 20  | 0.522 | 1,761,616 | 0.714 | 94.03 |
| 30  | 0.517 | 2,033,991 | 0.711 | 87.91 |
| 40  | 0.517 | 2,542,148 | 0.720 | 88.35 |
| 50  | 0.514 | 2,942,949 | 0.711 | 87.28 |
| 60  | 0.514 | 2,842,743 | 0.714 | 86.78 |
| 70  | 0.507 | 3,276,861 | 0.705 | 87.66 |
| 80  | 0.506 | 3,121,752 | 0.708 | 82.65 |
| 90  | 0.512 | 3,174,007 | 0.682 | 80.96 |
| 100 | 0.491 | 2,877,073 | 0.657 | 89.33 |

The invention claimed is:

1. An insulative cellular non-aromatic polymeric material comprising
    about 50% to about 99.9% by weight of high density polyethylene (HDPE) base resin,
    up to about 1% by weight of a chemical blowing agent,
    up to about 15% by weight of a nucleating agent, and
    a physical blowing agent,
    wherein the insulative cellular non-aromatic polymeric material has a density of about 0.2 g/cm$^3$ to about 0.9 g/cm$^3$.

2. The insulative cellular non-aromatic polymeric material of claim 1, further comprising a low density polyethylene (LDPE) base resin.

3. The insulative cellular non-aromatic polymeric material of claim 2, wherein the LDPE base resin is up to about 50% by weight of the insulative cellular non-aromatic polymeric material.

4. The insulative cellular non-aromatic polymeric material of claim 3, wherein the LDPE base resin is about 10% to about 30% by weight of the insulative cellular non-aromatic polymeric material.

5. The insulative cellular non-aromatic polymeric material of claim 4, wherein the LDPE base resin is about 20% by weight of the insulative cellular non-aromatic polymeric material.

6. The insulative cellular non-aromatic polymeric material of claim 4, wherein the chemical blowing agent comprises citric acid and is about 0.1% to about 0.5% by weight of the insulative cellular non-aromatic polymeric material.

7. The insulative cellular non-aromatic polymeric material of claim 3, wherein the HDPE base resin comprises a copolymer.

8. The insulative cellular non-aromatic polymeric material of claim 7, wherein the physical blowing agent is introduced at a rate between about 0.01 kg/h and about 0.6 kg/h.

9. The insulative cellular non-aromatic polymeric material of claim 8, wherein the physical blowing agent is introduced at a rate of about 0.03 kg/h.

10. The insulative cellular non-aromatic polymeric material of claim 2, wherein the nucleating agent is about 0.5% to about 5% by weight of the insulative cellular non-aromatic polymeric material.

11. The insulative cellular non-aromatic polymeric material of claim 1, wherein the HDPE base resin is about 60% to about 99% by weight of the insulative cellular non-aromatic polymeric material.

12. The insulative cellular non-aromatic polymeric material of claim 11, wherein the HDPE base resin is about 80% by weight of the insulative cellular non-aromatic polymeric material.

13. The insulative cellular non-aromatic polymeric material of claim 12, wherein the chemical blowing agent is about 0.1% by weight of the insulative cellular non-aromatic polymeric material.

14. The insulative cellular non-aromatic polymeric material of claim 13, wherein the nucleating agent is talc and is about 1% by weight of the insulative cellular non-aromatic polymeric material.

15. The insulative cellular non-aromatic polymeric material of claim 1, wherein the nucleating agent is talc and is about 0.5% to about 5% by weight of the insulative cellular non-aromatic polymeric material and the chemical blowing agent comprises citric acid and is about 0.1% to about 0.5% by weight of the insulative cellular non-aromatic polymeric material.

16. The insulative cellular non-aromatic polymeric material of claim 1, wherein the density of the insulative cellular non-aromatic polymeric material is about 0.25 g/cm$^3$ to about 0.4 g/cm$^3$.

17. The insulative cellular non-aromatic polymeric material of claim 16, wherein the density of the insulative cellular non-aromatic polymeric material is about 0.35 g/cm$^3$.

18. An insulative cellular non-aromatic polymeric material comprising
    a base resin blend including a high density polyethylene (HDPE) base resin and a low density polyethylene (LDPE) base resin,
    a chemical blowing agent,
    a nucleating agent, and
    a physical blowing agent,
    wherein the insulative cellular non-aromatic polymeric material has a density of about 0.2 g/cm$^3$ to about 0.5 g/cm$^3$.

19. The insulative cellular non-aromatic polymeric material of claim 18, wherein the LDPE base resin is up to about 50% by weight of the base resin blend.

20. The insulative cellular non-aromatic polymeric material of claim 19, wherein the LDPE base resin is about 10% to about 30% by weight of the base resin blend.

21. The insulative cellular non-aromatic polymeric material of claim 20, wherein the LDPE base resin is about 20% by weight of the base resin blend.

22. The insulative cellular non-aromatic polymeric material of claim 19, wherein the insulative cellular non-aromatic polymeric material further comprises regrind.

23. The insulative cellular non-aromatic polymeric material of claim 22, wherein the regrind is up to about 50% by weight of the insulative cellular non-aromatic polymeric material.

24. The insulative cellular non-aromatic polymeric material of claim 23, wherein the regrind is up to about 30% by weight of the insulative cellular non-aromatic polymeric material.

25. The insulative cellular non-aromatic polymeric material of claim 24, wherein the physical blowing agent is up to about 0.2% of the insulative cellular non-aromatic polymeric material.

26. The insulative cellular non-aromatic polymeric material of claim 19, wherein the HDPE base resin is about 50% to about 90% by weight of the base resin blend.

27. The insulative cellular non-aromatic polymeric material of claim 26, wherein the HDPE base resin is about 80% by weight of the base resin blend.

28. The insulative cellular non-aromatic polymeric material of claim 27, wherein the physical blowing agent is about 0.1% to about 0.3% of the insulative cellular non-aromatic polymeric material.

29. The insulative cellular non-aromatic polymeric material of claim 28, wherein the physical blowing agent is N$_2$ gas.

* * * * *